United States Patent
Sundaresan et al.

(10) Patent No.: US 9,521,560 B2
(45) Date of Patent: Dec. 13, 2016

(54) MULTICELL BEAMFORMING SYSTEM AND METHODS FOR OFDMA SMALL-CELL NETWORKS

(71) Applicant: NEC Laboratories America, Inc., Princeton, NJ (US)

(72) Inventors: Karthikeyan Sundaresan, Howell, NJ (US); Mohammad Ali Khojastepour, Lawrenceville, NJ (US); Sampath Rangarajan, Bridgewater, NJ (US); Jongwon Yoon, Madison, WI (US)

(73) Assignee: NEC Corporation (JP)

( * ) Notice: Subject to any disclaimer, the term of this patent is extended or adjusted under 35 U.S.C. 154(b) by 97 days.

(21) Appl. No.: 14/231,290

(22) Filed: Mar. 31, 2014

(65) Prior Publication Data

US 2015/0281978 A1    Oct. 1, 2015

(51) Int. Cl.
  *H04W 16/28*    (2009.01)
  *H04W 24/08*    (2009.01)
  *H01Q 3/00*    (2006.01)

(52) U.S. Cl.
  CPC ............... *H04W 16/28* (2013.01); *H01Q 3/00* (2013.01)

(58) Field of Classification Search
  CPC .. H04W 52/241; H04W 72/046; H04W 40/12; H04W 92/02
  See application file for complete search history.

(56) References Cited

U.S. PATENT DOCUMENTS

| | | | |
|---|---|---|---|
| 2008/0259826 A1* | 10/2008 | Struhsaker | 370/280 |
| 2009/0170497 A1* | 7/2009 | Miao et al. | 455/422.1 |
| 2011/0096738 A1* | 4/2011 | Choi | H04B 7/0452 370/329 |
| 2015/0092621 A1* | 4/2015 | Jalloul et al. | 370/278 |

* cited by examiner

*Primary Examiner* — Andrew Chriss
*Assistant Examiner* — Romani Ohri
(74) *Attorney, Agent, or Firm* — Joseph Kolodka

(57) ABSTRACT

Disclosed are systems, methods and structures that provide improved spatial reuse of spectral resources in small-cell wireless networks including WiMAX, LTE, LTE-Advanced, etc. Advantageously, the systems and method disclosed while leveraging beamforming for spatial reuse across small cells also decouple it from per-frame scheduling at a small cell base station thereby allowing for beam selections to be computed with a granularity measured in seconds. In realizing these advantages, systems, methods and structures disclosed integrate beam selection with client association.

7 Claims, 25 Drawing Sheets

Algorithm 1 CABS Algorithm

1: INPUT: average SNR $\rho_{ji}^b$, $\forall i \in \mathcal{S}, j \in \mathcal{K}, b \in \mathcal{B}$
2: OUTPUT: Beam selection $\pi(i)$ and client association $\mathcal{A}_i$, $\forall i \in \mathcal{S}$
3: Initialization of beam choices, i.e., $\pi(i)$, $\forall i$
4: for $i \in [1 : |\mathcal{S}|], b \in [|\mathcal{B}|]$ do
5:     $\mathcal{L} = \emptyset, u_{ib} = 0$
6:     while 1 do
7:       $j^* = \arg\max_{j \in \mathcal{K} \setminus \mathcal{L}} \sum_{k \in \mathcal{L} \cup j} U(t_{ki}^b) - u_{ib}$
8:       if $j^* = \emptyset$ then break
9:       $\mathcal{L} \leftarrow \mathcal{L} \cup j^*$; $u_{ib} = \sum_{k \in \mathcal{L}} U(t_{ki}^b)$
10:    end while
11: end for
12: $\pi(i) = \arg\max_b u_{ib}$, $\forall i$
13:
14: for $i \in [1 : |\mathcal{S}|]$ do
15:    for $b \in [1 : |\mathcal{B}|]$ do
16:      % Solve client association by varying only one beam element at a time
17:      $\pi(i) = b$, $A_i = \emptyset$, $\forall i$
18:      $(i^*, j^*) = \arg\max_{(i,j) s.t. j \notin \cup_i A_i} \{\sum_{k \in A_i \cup j} U(t_{ki}^\pi) - \sum_{k \in A_i} U(t_{ki}^\pi)\}$
19:      $A_{i^*} \leftarrow A_{i^*} \cup j^*$; $u_{ib}^\pi = \sum_i \sum_{j \in A_i} U(t_{ji}^\pi)$
20:    end for
21:    $\pi(i) = \arg\max_b u_{ib}^\pi$
22: end for

*FIGURE 13*

MULTICELL BEAMFORMING SYSTEM AND METHODS FOR OFDMA SMALL-CELL NETWORKS

TECHNICAL FIELD

This disclosure relates generally to the field of wireless communications systems and in particular to multi-cell beamforming systems and methods for small-cell networks.

BACKGROUND

As is known, wireless communications are becoming an increasingly indispensible aspect of contemporary life. Accordingly, systems, methods and techniques that enhance the efficiency of wireless communications systems represent a welcome addition to the art.

SUMMARY

An advance is made in the art according to an aspect of the present disclosure directed to systems and methods for multi-cell beamforming for small cell networks. According to an aspect of the present disclosure, client scheduling is decoupled from client scheduling such that reuse potential of small cell networks are enhanced.

According to one aspect of the present disclosure, a low complexity, highly accurate signal-to-interference-plus-noise ratio (SINR) estimation module that determines interference dependencies for beamforming between small cells is disclosed. According to another aspect of the present disclosure, an efficient, low complexity joint client association and beam selection method for the small cells is disclosed wherein the method advantageously schedules at the small cells without being coupled to it.

BRIEF DESCRIPTION OF THE DRAWING

A more complete understanding of the present disclosure may be realized by reference to the accompanying drawings in which:

FIG. 13 is a pseudo-code listing of an exemplary CABS method according to an aspect of the present disclosure that associates clients for a given beam configuration.

DETAILED DESCRIPTION

Figure 1:
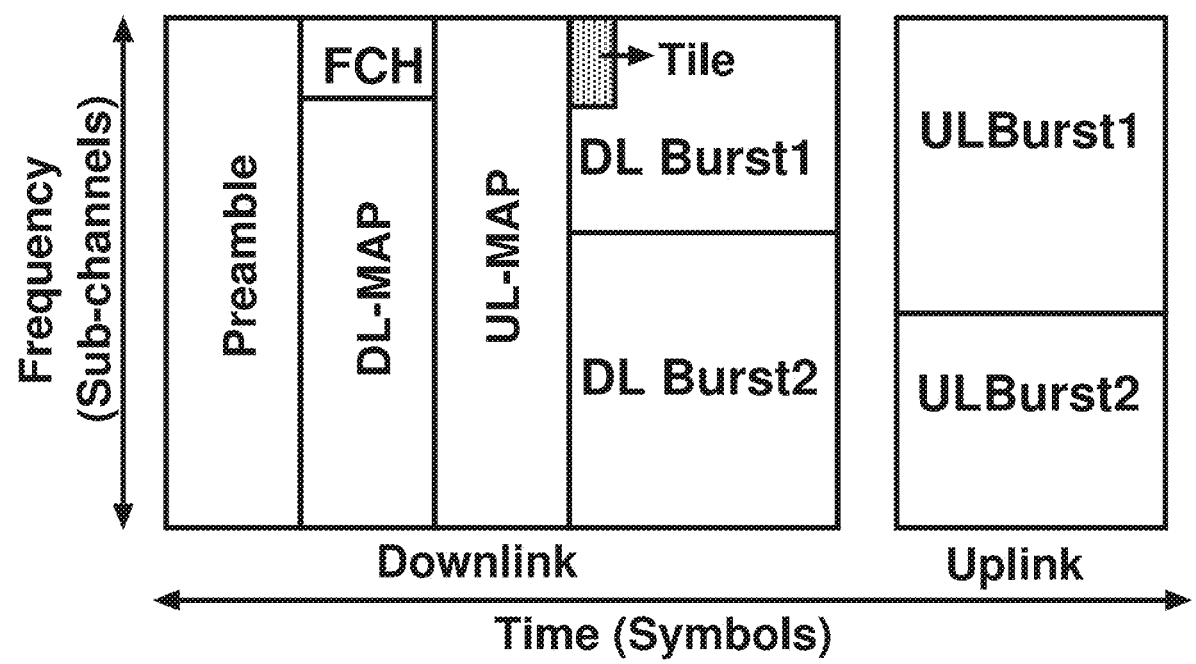
FIG. 1 is a schematic block diagram depicting a WiMAX frame structure according to the present disclosure.

The following discussion and attached Appendix-A and Appendix-B merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

According to the present disclosure, we disclose Pro-Beam—a practical system for improving spatial reuse through beamforming in OFDMA based small cell networks. ProBeam advantageously decouples beamforming from client scheduling such that practical feasibility is realized. Of particular significance, ProBeam jointly addresses client association with beamforming such that reuse benefits from beamforming are realized. ProBeam incorporates a low complexity, highly accurate SINR estimation module with less than 1 dB error (<=5%) to determine interference dependencies between small cells. It also houses an efficient, low complexity joint client association and beam selection method for the small cells that yields close-to-optimal performance. Prototype implementation in a real WiMAX network of four small cells shows 115% capacity gain as compared to other baseline reuse schemes. Of further advantage, the scalability and efficacy of Pro-Beam is established as applicable to larger implementations through simulations. Finally, ProBeam is applicable to LET and LTE-A with minor modifications and is of course, applicable to newer, alternative beam patterns.

The proliferation of smartphones and tablet devices has made it necessary for mobile operators to consider new technologies that provide increased network capacity. Small cells (micro and pico cells) provide a promising solution to address this need and are already being deployed for 3G networks, with future rollouts of 4G small cells [See, e.g., R. Van Nee and R. Prasad, "OFDM for Wireless Multimedia Communications", *Artech House,* 2000]. With reduced cell sizes and dense deployments, small cells are geared for increased spatial reuse of spectral resources—a valuable and scarce commodity in next generation wireless networks (WiMAX, LTE, LTE-advanced, etc.).

Given the dense deployment of small cells, interference plays a key limiting factor in harnessing their potential. While the sheer scale limits planned deployment of small cells (similar to WiFi), handling interference is a very different problem in small cells compared to WiFi. This can be attributed to their synchronous access mechanism (borrowed from macrocells), coupled with OFDMA (orthogonal frequency division multiplex access) transmissions, wherein multiple users are served in the same frame. Earlier works on interference management in small cell networks [See, e.g., M. Y. Arslan, J. Yoon, K. Sundaresan, S. V. Krishnamurthy, and S. Banerjee, "A Resource Management System for Interference Mitigation in Enterprise OFDMA Femtocells", *IEEE/ACM Transactions on Networking,* vol. 21, no. 5, pp. 1447-1460, November 2013; and J. Yoon, M. Y. Arslan, K. Sundaresan, S. V. Krishnamurthy, and S. Banerjee, "A Distributed Resource Management Framework for Interference Mitigation in OFDMA Femtocell Networks", In proc. of *ACM MobiHoc,* 2012] employed interference avoidance in the time or frequency domain by allocating orthogonal resources to interfering small cells, therefore part of the spectral resources have to be sacrificed between interfering cells. According to one aspect of the present disclosure, we aim to avoid such sacrifices of spectral resources by exploring interference management for small cells in the spatial domain through beamforming antennas.

Employing beamforming or directional antennas for spatial reuse in a multi-cell set-up has been considered in the context of WiFi [See, e.g. X. Liu, A. Sheth, M. Kaminsky, K. Papagiannaki, S. Seshan, and P. Steenkiste, "DIRC: Increasing Indoor Wireless Capacity Using Directional Antennas", In proc. of *ACM Sigcomm,* 2009; and X. Liu, A. Sheth, M. Kaminsky, K. Papagiannaki, S. Seshan, and P. Steenkiste, "Pushing the Envelope of Indoor Wireless Spatial Reuse using Directional Access Points and Clients", In proc. of *ACM MobiCom,* 2010]. However, such approaches face a key limitation when it comes to practical realization in that a single client is assumed for each AP when computing interference conflicts and determining the spatial reuse schedule. When the client scheduled for an AP changes, the interference conflicts change, requiring a re-computation of the schedule, potentially at the granularity of every packet. This makes it hard to realize such solutions for practically sized WiFi networks and more so for small-cell networks, where multiple clients are scheduled in each OFDMA frame. Hence, the goal of this work is to leverage beamforming for spatial reuse across small cells but at the same time decouple it from per-frame scheduling at the small cell base station (B S), thereby allowing for beam selections to be computed only at the granularity of seconds (hundreds of frames).

Executing beam selection at coarser time scales compared to client scheduling allows for tangible spatial reuse benefits across cells. However, the beam chosen for a small cell must now deliver good transmission rates to all the users that are associated (and hence can be scheduled) with the small cell in order to realize the throughput gains from spatial reuse. Hence, we argue that to realize practical and efficient spatial reuse with small cells, it is important to not just decouple beam selection from scheduling but also integrate beam selection with client association. Towards this goal, our method and systems—ProBeam—a practical system that enables joint multi-cell beamforming and client association for increased spatial reuse in small cell networks.

As will become apparent to those skilled in the art, ProBeam incorporates at least two key components: (i) a SINR estimation module—this captures the interference dependencies between small cells in the presence of beamforming. Note that accurate SINR estimation would require measurement w.r.t all possible combination of beam choices at small cells, resulting in $O(m^n)$ measurements, where m and n are the number of beam choices and small cells respectively. ProBeam's estimation module indirectly computes SINR from SNR measurements, thereby resulting in only linear number of measurements (O(mn)) with an estimation error less than 1 dB for 95% confidence and a maximum error of 1.65 dB. (ii) a joint beam selection and client association module—given the hardness of beam selection and client association problems in isolation, their joint problem is significantly challenging to address optimally. ProBeam employs an efficient yet greedy ½—approximation algorithm for client association as a building block to converge to an efficient spatial reuse solution with both beam selection for small cells along with their client associations.

By way of illustration and example, we have implemented ProBeam on a four cell WiMAX-based small cell network. Our experimental evaluations reveal that ProBeam is within 90% of the optimal solution and provides close to 50% throughput gains by addressing the joint problem of client association along with beam selection compared to existing approaches that address only the latter.

As will become further apparent to those skilled in the art, we describe a low, linear complexity SINR estimation scheme with an error less than 1 dB to generate the interference dependencies needed for computing spatial reuse configurations. We further establish and describe the hardness of the joint beam selection and client association problem and describe a practical, yet efficient algorithm to address the same. Finally, we disclose and demonstrate the practicality and showcase the benefits of ProBeam by prototyping and evaluating it on a WiMAX-based network of four small cells.

WiMAX Preliminaries—OFDMA Small Cells:

Next generation small cell networks for LTE and WiMAX borrow their access mechanism from their macrocell counterparts and are based on OFDMA. Further, they operate on licensed spectrum and follow a synchronous access mechanism (unlike WiFi), wherein frames are transmitted periodically at fixed time intervals (1 ms in LTE, 5 ms in WiMAX). Each OFDMA frame is a two-dimensional template (time and frequency slots) that carries data to multiple clients—another key difference compared to WiFi. Transmissions between downlink (DL, BS to client) and uplink (UL, client to BS) are separated either in frequency (FDD) or in time (TDD). FIG. 1 shows an example of a WiMAX TDD frame, the underlying structure of which is common to LTE as well and modulation and coding scheme (MCS). Every frame carries a control and a data part, where the control part (e.g., DL and UL MAPs) provides information to the clients regarding where to pick (place) their respective downlink (uplink) data from the frame and what parameters (MCS) to use for decoding (encoding) the downlink (uplink) data. Clients use the uplink frame to report their instantaneous CSI (channel state information) to the BS, which in turn is used for diversity scheduling at the BS.

Given the dense deployment of small cells, resource and interference management among small cells happens at the cluster (tens of small cells) granularity, wherein a central entity (SON: self organizing network server [See, e.g., Femtocells Core Specification, WMF-T33-118-R016v01]) or one of the small cells in the cluster performs centralized resource management for the cells in the cluster and coordination is achieved with the help of a high speed backhaul. While clients use the preamble and control part of the frame to synchronize to the BS, the small cell BSs themselves can synchronize to the macrocell with the help of the SON server or with a GPS antenna module.

Beamforming:

Beamforming is one of the core features in next generation networks that is adopted to improve SNR at the intended receivers while decreasing interference at unintended receivers. A beamforming system typically uses multiple antenna elements in an array to form various beam patterns. Beam patterns reinforce transmission energy in desired directions by weighting the signal from the antenna array in both magnitude and phase. Beamforming can be either switched (directional) or adaptive. In switched, a pre-determined set of directional beam patterns covering the azimuth are stored and chosen based on coarse feedback (SNR or RSSI) from the client. In adaptive, fine-grained feedback of channel estimation from the client is used to adapt the beam pattern on the fly to reinforce multipath components and maximize the SINR at the client. By adapting to the instantaneous multipath channel, adaptive provides higher gain (at the cost of increased feedback) compared to switched. However, at the same time, it is more sensitive to channel fluctuations and requires timely feedback to track the channel state—a limiting constraint especially during mobility and in multi-cell resource management.

Both switched and adaptive beamforming co-exist in a complementary manner in cellular systems. Macrocells are sectored in operation (e.g., three 120° or six 60° directional beams), while adaptive beamforming is enabled to clients within each of the sectors separately. Unlike macrocells, where interference is restricted to cell-edges, thereby allowing for all sectors to operate in tandem, interference is a more pervasive phenomenon in small cells [See, e.g., M. Y. Arslan, J. Yoon, K. Sundaresan, S. Krishnamuthy, and S. Banerjee, "Characterization of Interference in OFDMA Femtocell Networks", In proc. of *IEEE Infocom,* 2012].

Figure 2:
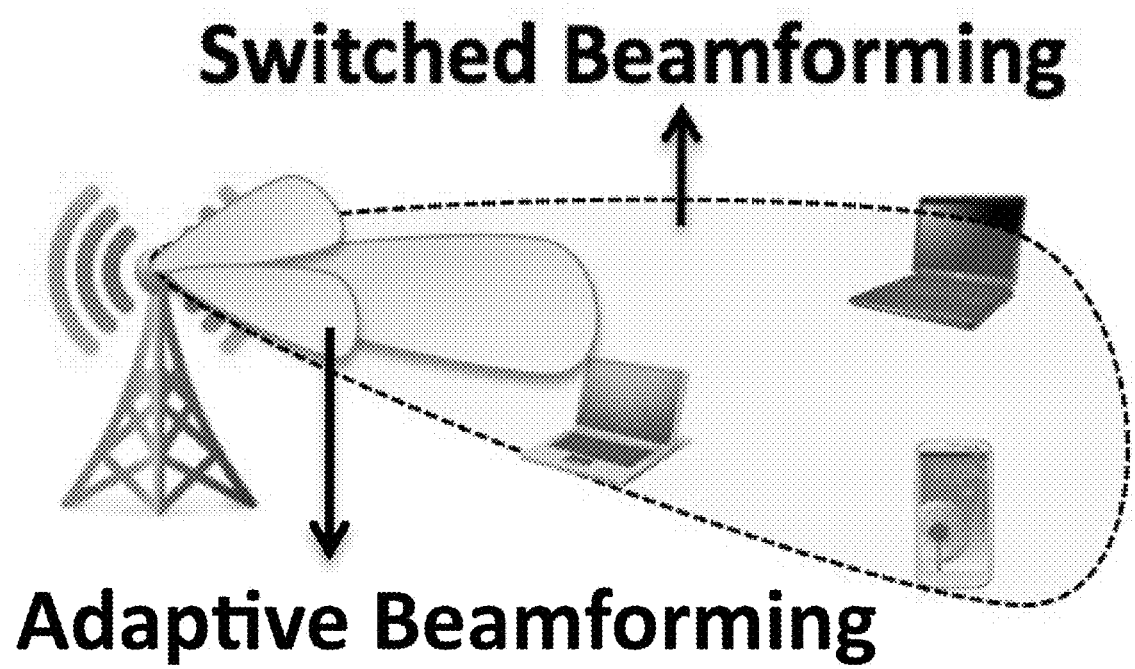
FIG. 2 is a schematic diagram showing adaptive beamforming according to an aspect of the present disclosure.

This requires small cells to select a single sector (switched beam) for operation in a frame (adaptable across frames) so as to avoid interference and maximize reuse among small cells in a dense deployment. Note that adaptive beamforming can still be enabled to clients within the sector of operation at each small cell (see FIG. 2 for illustration).

Interference has been shown to be a key performance limiting factor for small cells [See, e.g, M. Y. Arslan, J. Yoon, K. Sundaresan, S. Krishnamuthy, and S. Banerjee, "Characterization of Interference in OFDMA Femtocell Networks", In proc. of *IEEE Infocom,* 2012]. This necessitates interference mitigation solutions that incorporate dynamic resource partitioning strategies. There have been studies [See, e.g., J. Yun and K. G. Shin, "Adaptive Interference Management of OFDMA Femtocells for Co-Channel Deployment", *IEEE Journal on Selected Areas in Communications,* vol. 29, no. 6, pp. 1225-1241, June 2011; and K. Sundaresan and S. Rangarajan, "Efficient Resource Management in OFDMA Femto Cells", In proc. of *ACM MobiHoc,* 2009] in this direction but are restricted to theory with several simplifying assumptions that restrict their scope and deployment. More recent proposals for centralized and distributed resource management schemes respectively for interference mitigation and demonstrate their efficacy in practice have been made. These solutions allocate orthogonal resources to interfering small cells to avoid interference while reusing resources for the clients that do not incur interference. However, such resource isolation either in time or frequency comes at the cost of sacrificing resources, which in turn can be avoided by addressing interference in the spatial domain through beamforming.

There are several recent works on resource allocation problems in OFDMA networks. R. Aggarwal, M. Assaad, C. E. Koksal, and P. Schniter, in a paper entitled "Joint Scheduling and Resource Allocation in the OFDMA Downlink: Utility Maximization under Imperfect Channel-State Information", which appeared in *IEEE Transactions on Signal Process*, vol. 59, no. 11, pp. 5589-5604, November 2011 investigated the problem of joint user-scheduling and resource allocation under channel uncertainty in downlink OFDMA systems. I.-H. Hou and C. S. Chen, authors of "Self-organized Resource Allocation in LTE Systems with Weighted Proportional Fairness", which appeared in proc. of *IEEE ICC,* 2012 considered the problem of resource allocation and network optimization in LTE networks. In particular, they proposed a distributed protocol to achieve weighted proportional fairness among clients under various system models. Similarly, we adapt proportional fairness in our utility function while achieving fairness among clients and maximizing system utility. Finally, S. Borst, M. Markakisy and I. Saniee, in a paper entitled "Distributed Power Allocation and User Assignment in OFDMA Cellular Networks", that appeared in proc. of *IEEE Allerton Conference on Communication, Control, and Computing*, 2011 proposed a distributed optimization approach for jointly allocating power and assigning users to cells in OFDMA cellular network. In contrast, ProBeam is a centralized solution to jointly optimize the client associations and beam selections. One of our goals is to mitigate interference purely in the spatial domain without having to sacrifice time/frequency/power resources in each cell.

In the space of beamforming, others attempt to increase the capacity of WLANs through spatial reuse by considering directional antennas only at the APs or at both APs and clients. However, client association is assumed and conflicts and reuse schedule are computed w.r.t a single client at each AP. This limits the practical applicability of such solutions (especially for OFDMA systems) since conflicts and reuse schedules have to be recomputed (potentially every packet) every time the client scheduled with any of the AP changes. Several theoretical works [See, e.g., S. He, Y. Huang, L. Yang, A. Nallanathan, and P. Liu, "A Multi-Cell Beamforming Design by Uplink-Downlink Max-Min SINR Duality", *IEEE Transactions on Wireless Communications*, vol. 11, no. 8, pp. 2858-2867, August 2012; and H. Dahrouj, and W. Yu, "Coordinated Beamforming for the Multicell Multi-Antenna Wireless System", *IEEE Transactions on Wireless Communications*, vol. 9, no. 5, pp. 1748-1759, May 2010] have looked at adaptive beamforming in a multi-cell context. However, idealized settings are assumed that require fine grained CSI from all transmitters to all clients be made available to the reuse algorithm at every frame interval. Given the practical feasibility (or lack thereof) of such approaches, experimental works [See, e.g., E. Aryafar, A. Khojastepour, K. Sundaresan, S. Rangaraj an, and E. Knightly, "ADAM: An Adaptive Beamforming System for Multicasting in Wireless LANs", *IEEE/ACM Transactions on Networking*, vol. 21, no. 5, pp. 1595-1608, November 2013] have appropriately focused on adaptive beamforming for SNR improvements within a single cell. Further, none of these works address client association jointly with beamforming.

Accordingly, one focus of our work is to design a practical multi-cell spatial reuse system that, decouples client scheduling from beamforming, employs switched beamforming for interference management between small cells, and jointly addresses client association to increase the potential of spatial reuse from beamforming. Being complementary, adaptive beamforming can still be leveraged for SNR improvement within each small cell (although not considered in this work).

Beamforming in a multi-cell context has two benefits: (i) increased link capacity through improved SNR, and (ii) increased network capacity through reduced interference (higher SINR) and hence higher spatial reuse. The beam choice of one cell impacts the interference seen by the clients of another cell, thereby requiring a coordinated approach to beam selection across small cells for maximum reuse benefits. However, given the simplicity of un-coordinated, per-cell beamforming (focusing only on SNR), it is important to understand the benefits from coordination and hence the need for it.

Figure 3A:
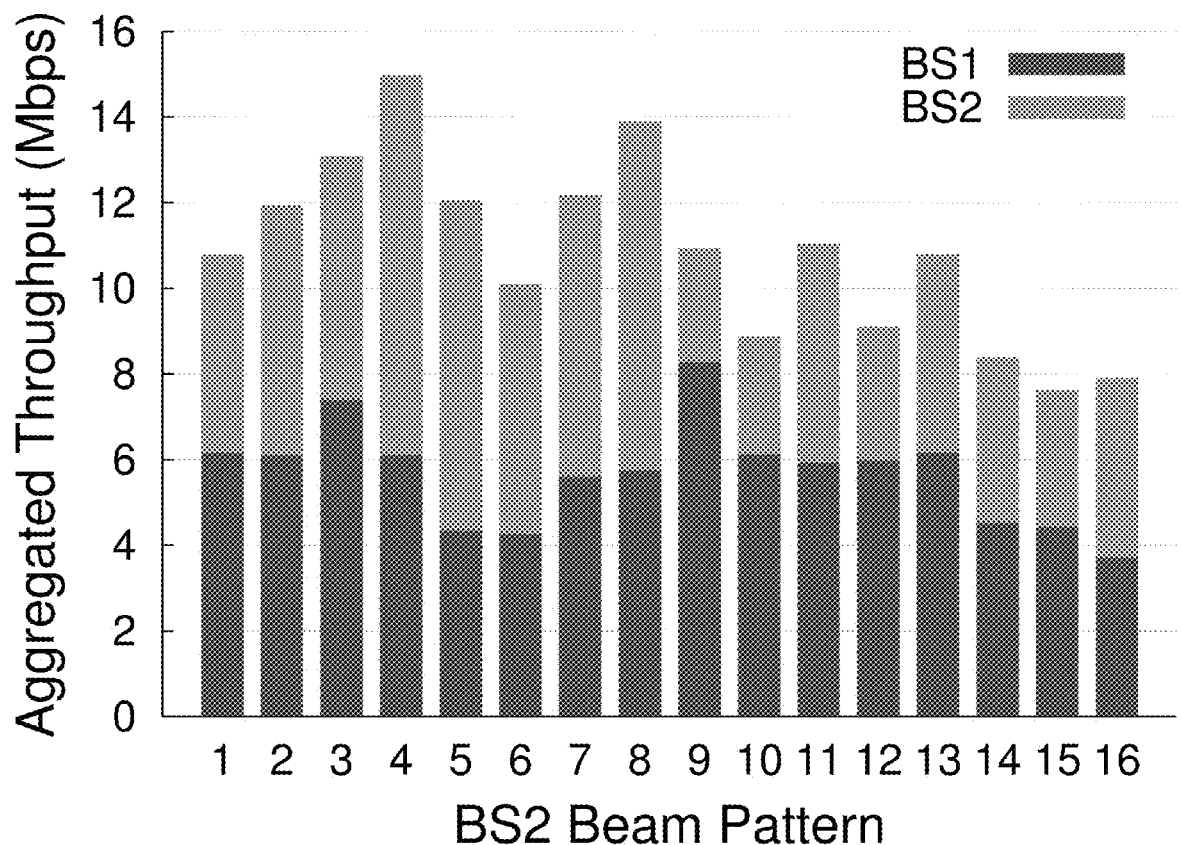
FIGS. 3(a)-3(b) show bar graphs depicting motivation for coordinated beam selection for: (a) a two cell network and (b) a three cell network according to an aspect of the present disclosure.
Figure 3B:
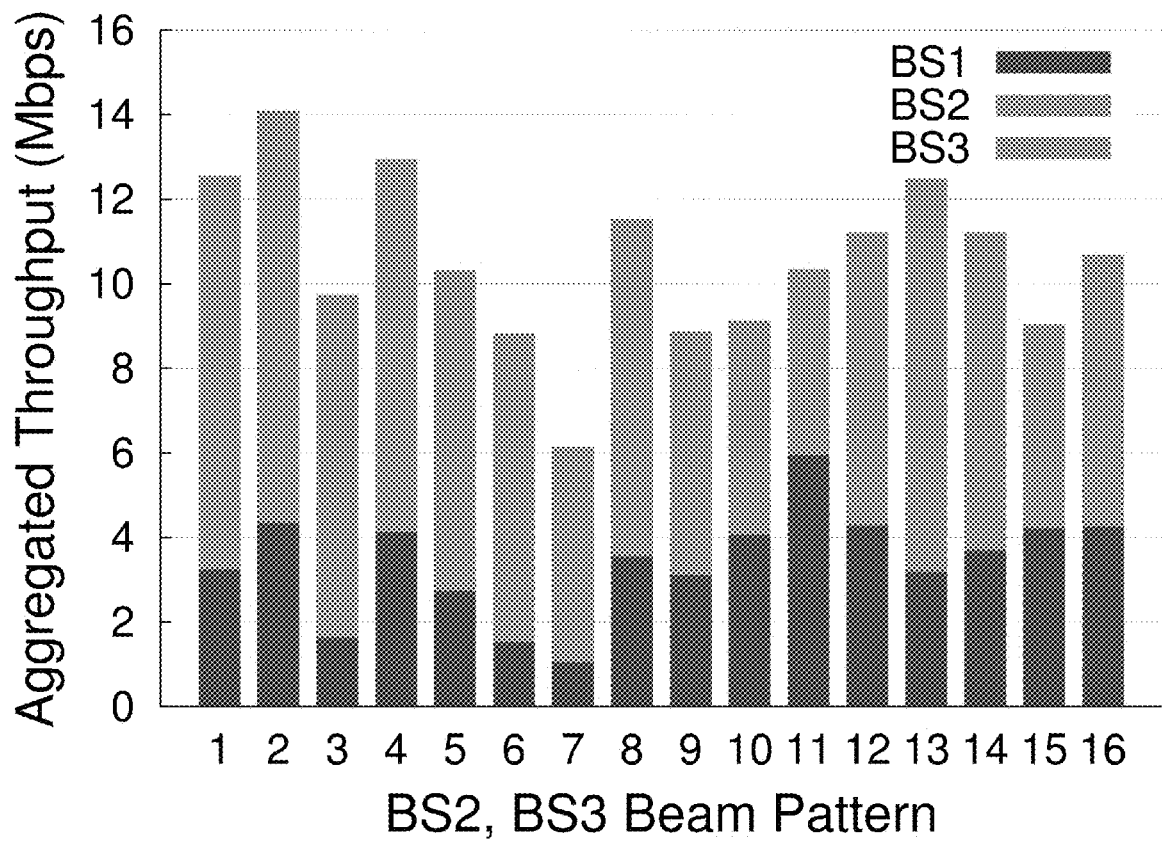

We construct a topology with two small cells, each with one scheduled client. First BS1 cycles through all its sixteen beam patterns to determine the one yielding the best rate to its client (C1) in isolation. BS1 is then fixed to use its best beam to C1. Now, in the presence of BS1, BS2 is made to transfer data to its client (C2) on each of its 16 patterns sequentially. We plot the throughput observed at C1 (blue bars) and C2 (grey bars) as a function of the beam pattern used by BS2 in FIG. 3(*a*). Two observations can be made: (i) The interference projected by BS2 on C1 depends tightly on the beam chosen by BS2. C1 achieves its highest throughput (8.3 Mbps) when BS2 employs its 9th pattern and its lowest throughput (3.7 Mbps) when BS2 employs its 16th pattern. (ii) The beam maximizing the throughput of one cell does not necessarily maximize the multi-cell network throughput. While the 9th beam pattern maximizes C1's throughput, it is the 4th pattern that maximizes the aggregate network throughput. A similar behavior is also evident in the three cell experiment presented in FIG. 3(*b*), where the pattern (11th) maximizing throughput for C1 differs from the one (2nd) maximizing the aggregate network throughput. The throughput gain of employing the 2nd pattern over the 11th one is almost 40%. Thus, a well-coordinated beamforming algorithm across the small cells is indeed important to maximize the aggregate network throughput.

Client association has been traditionally employed to load balance clients between multiple cells so as to effectively utilize the capacity of each cell and network as a whole. However, in the context of multi-cell beamforming, client association has a bigger role to play. Note that, unlike in WiFi systems, where a single client is served by a cell at a time, OFDMA systems multiplex multiple clients in the same frame (diversity scheduling). This requires that the beam selected for the small cell cater effectively to all its associated and scheduled clients. Further, since the beam choice for a cell impacts the interference and hence performance seen by other cells, this naturally results in client association being closely coupled with multi-cell beamforming.

Figure 4A:
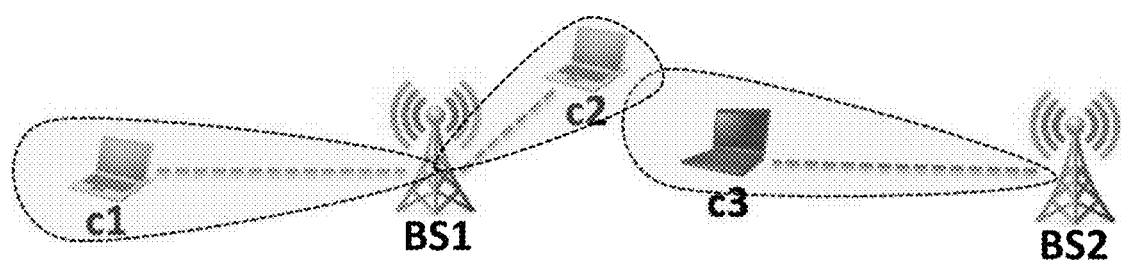
FIGS. 4(a)-4(b) show a schematic diagram of flexible client association wherein (a) shows SNR based association wherein C2 is associated with BS1 and (b) flexible association wherein C2 is associated with BS2 according to an aspect of the present disclosure.
Figure 4B:
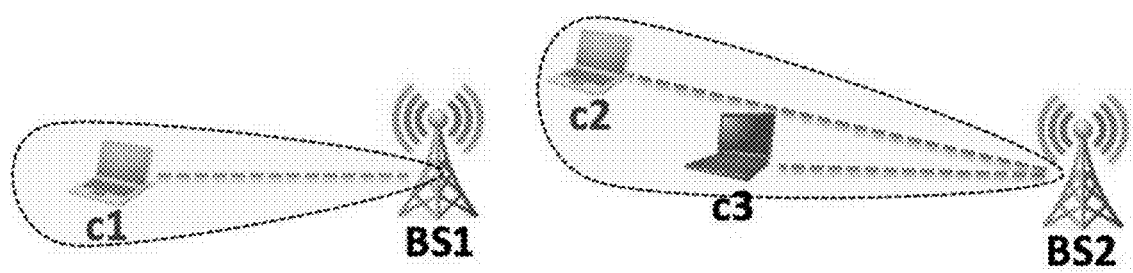

To see this, consider the following illustration in FIG. 4(*a*). In conventional association, where SNR is used as a metric for client association, clients C1 and C2 will be associated to BS1, while C3 will be associated to BS2 based on (high) SNR and completely decoupled from beamforming. BSs will then determine the best beams to communicate with their respective clients. Let b1 and b2 be the only beams on which C2 and C3 can receive good signal strength from their respective BSs. Now, when BS1 is employing beam b1 to communicate with C2, this will receive interference from the beam b2 used by BS2 to communicate with its client C3. By fixing the client association, depending on the location of associated clients, the ability of beamforming to effectively suppress interference between cells is potentially limited. In contrast, by allowing for flexible association (FIG. 4(*b*)), C2 can be associated with BS2 even though it has a lower SNR to BS2. This would allow BS2 to schedule C2 and C3 jointly on a beam that suffers no interference from that employed by BS1, thereby resulting in a potentially higher SINR for all clients.

Figure 5:
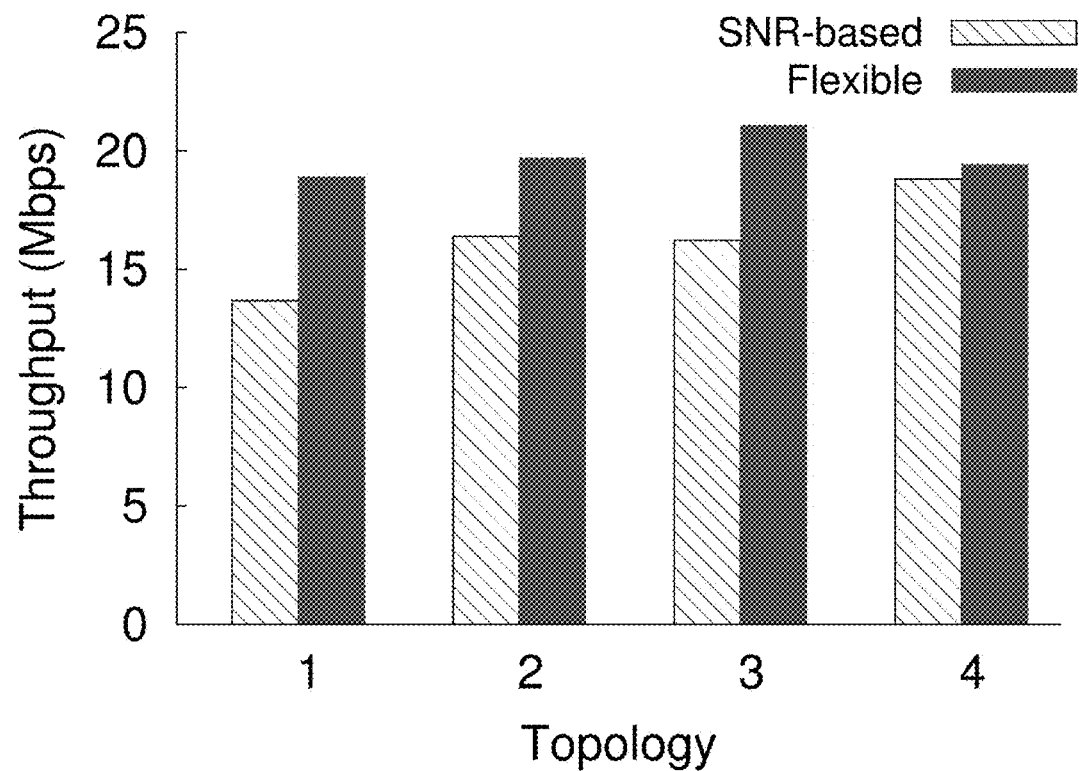
FIG. 5 is a bar graph showing joint association increasing throughput by 40% compared to decoupled (SNR based) association according to an aspect of the present disclosure.

To quantify the benefits of coupling client association with beam selection for small cells, we conduct the following experiment with two small cells and three clients, and generate multiple topologies by varying the client locations. We consider two association strategies: decoupled association, where the best coordinated beam (for maximum aggregate throughput) for each small cell is selected after client association is done based on SNR; joint association, where the client association yielding the highest aggregate throughput is computed for all beam combinations between the two cells. The aggregate throughput results for these two strategies in FIG. 5 indicate that joint association can yield gains as high as 40%, with an average gain of about 25%.

This in turn motivates the need to jointly address client association with beam selection for small cells, whereby client association can be effectively used to maximize the spatial reuse potential of beamforming.

Small cell networks can be deployed for enterprises as well as outdoors. A central controller (separate entity or one of the small cells) is designated to perform resource and interference management for a cluster (tens) of small cells jointly with a high speed backhaul available for information exchange between them. We expect ProBeam to reside in this central controller (CC). Self-organizing network (SON) enables the radio and network components to interact among themselves, and to configure and tune the mobile system automatically in real time [See, e.g., WiMAX forum tech report: Architecture, detailed Protocols and Procedures Self-Organizing Networks, WMF-T33-120-R016v01.]

We can consider that CC is one particular example of a centralized SON server because of the fact that CC coordinates and configures all small cells in the network. In addition, CC also synchronizes all small cells in the network for adapting beam patterns. The CC exchanges small messages with the BSs via dedicated wired connection, and hence it induces minimal overhead to the system and does not interfere with the BS's functionalities. Collecting SNR measurements follows IEEE 802.16e standard [See, e.g, IEEE 802.16e-2005 Part 16: Air Interface for Fixed and Mobile Broadband Wireless Access Systems, *IEEE 802.16e standard*]. Note that while our primary focus is small cell networks, our system is equally applicable to WiFi networks as well.

ProBeam's spatial reuse solution operates in epochs which span several seconds (hundreds of frames). In each epoch, the sequence of operations are as follows. (i) Interference estimation for beamforming: The clients measure the average SNR on each of the beams from each of the BSs and forward it to the CC, which then infers their corresponding SINR for various beam combinations at the small cell BSs; (ii) Joint beam selection and client association: Based on the interference information collected, the CC runs its spatial reuse algorithm (for a desired objective) to determine the beam choice for each of the small cells as well as the clients that are associated with it for that epoch; and (iii) Scheduling: Once each small cell BS receives its beam choice and client set, it begins scheduling its clients locally using its own scheduler (proportional fair, max-min fair, etc.) for each frame in the epoch, while applying the beam selected to the frame transmissions.

Interference Estimation for Beamforming

Estimating the interference at clients accurately is critical for the efficient operation of ProBeam.

Reducing Complexity:

Measuring the SINR directly at the clients for various beam configurations (interference) used by small cells is the most accurate approach. However, this would entail that each small cell cycle through each beam pattern, while keeping the beam patterns at other cells fixed and measuring the resulting SINR at all clients. This would however result in a total of $O(nm^n)$ measurements, where m in the number of beam patterns and n is the number of small cells. ProBeam measures only the client SNR from each of the small cells in isolation for the various beam choices and then uses this information to estimate the projected client SINR for a given beam configuration at the small cells. By allowing the small cells to operate in isolation during measurements, this significantly reduces the SINR estimation complexity to $O(mn)$. One question remaining is the accuracy or lack thereof of such an estimation procedure.

Note that SINR can be expressed as $$SINR_{ij} = \frac{SNR_{ij}}{\sum_{k \neq i} INR_{kj} + 1},$$

where SINR at client j from BS i is related to its SNR and net interference to noise ratio from other BSs $$\left(INR_j = \sum_{k \neq i} INR_{kj}\right).$$

Small cells being interference limited, INR+1≈INR. In the logarithmic (dB) domain, the relation can be expressed as SINR (dB)=SNR (dB)−INR (dB). Hence, in principle, the SINR at a client can be estimated from its SNR from the desired BS and its aggregate INR from all interfering BSs. For this to be possible, one needs to estimate each $INR_{kj}$, which can potentially be approximated as the client SNR when associated with the interfering BS in isolation (i.e., $SNR_{kj}$). However, in reality, the accuracy of such an estimation may depend on multiple factors such as quantization, offsets, estimation error, etc.

Figure 6A:
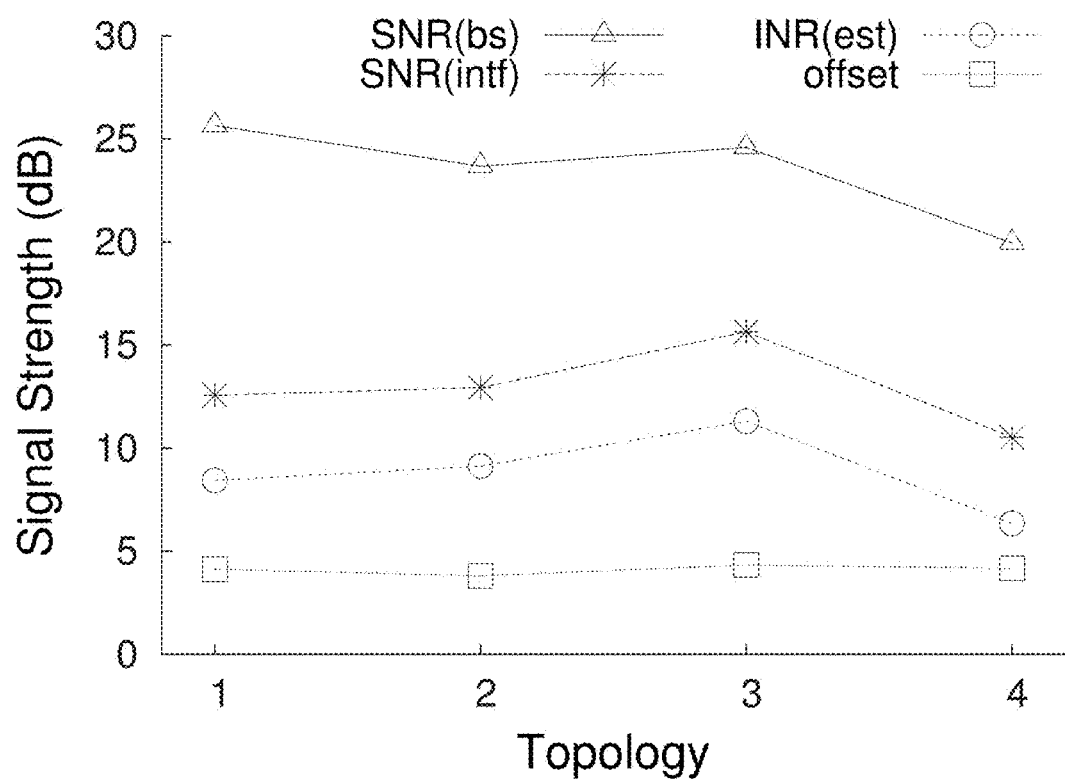
FIGS. 6(a)-6(c) are a series of graphs showing the accurate estimation of SINR from individual SNR estimates wherein (a) depicts interference estimation; (b) depicts an estimation with 2 interferers; and (c) depicts CDF of estimation error according to an aspect of the present disclosure.
Figure 6B:
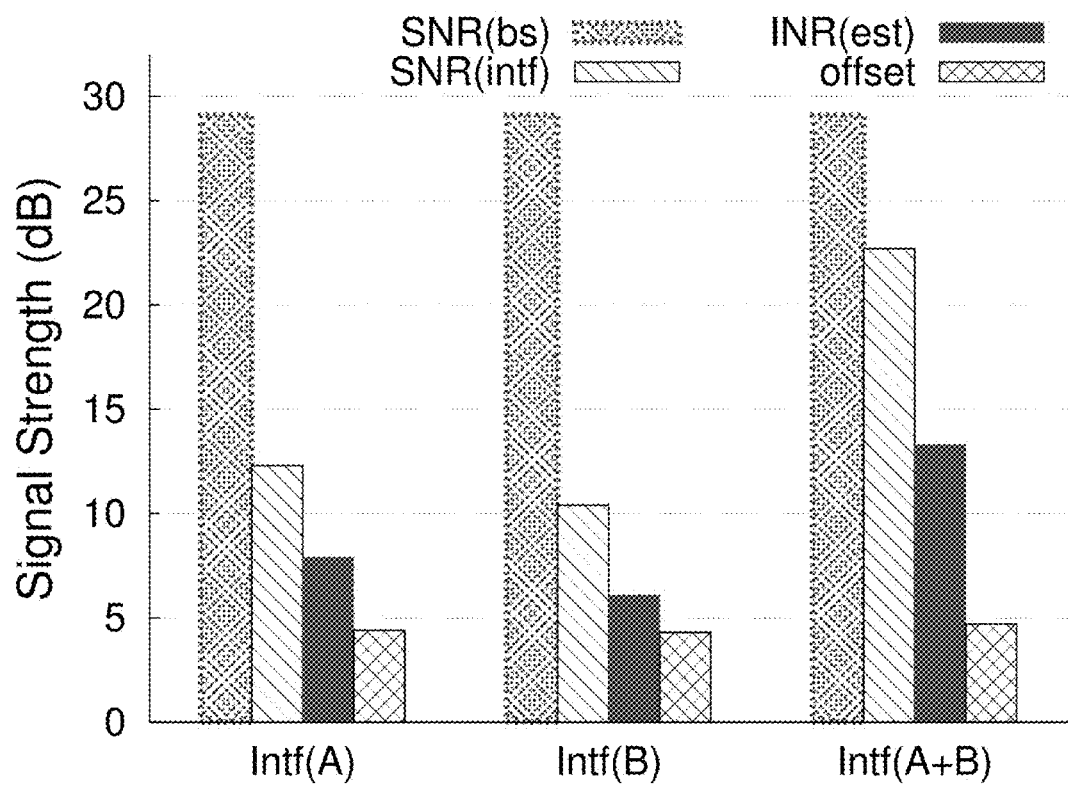

To verify this approximation, we conducted the following experiment with two small cell BSs, whose beam choices are such that they interfere at the client under consideration. The results are presented in FIG. 6(a). First, the client measures the signal strength from the associated BS in the absence ($SNR_{BS}$) and presence ($SINR_{BS}$) of interference respectively, from which we estimate $INR_{est} = SNR_{BS} - SINR_{BS}$. Then, the client records the signal strength $SNR_{intf}$ after associating with the interfering BS in isolation. Comparing $SNR_{intf}$ to $INR_{est}$ in FIG. 6(b), we see that there is a consistent 4 dB offset between the estimated interference and its corresponding signal strength and this remains fixed regardless of the topology and client SNR considered ($SNR_{BS}$ varies from 19 to 26 dB). We attribute this constant 4 dB difference to the inherent offset β introduced (during client feedback) by the MAC and its quantization of the signal strength value reported from the PHY layer. β being platform dependent, can be calibrated by the client and fed back to the Central Controller for its appropriate estimation of INR. Further, note that when SINR is directly measured, there is only one feedback value from the client. However, when SINR is estimated from SNR and multiple INRs, then each of the SNR feedback (corresponding to INR) introduces an offset that needs to be compensated. When appropriately compensated, the resulting estimation reduces to $$SINR_{ij}(dB) = SNR_{ij}(dB) - 10\log_{10}\left(\sum_{k \neq i} SNR_{kj}\right) + \beta.$$

Figure 6C:
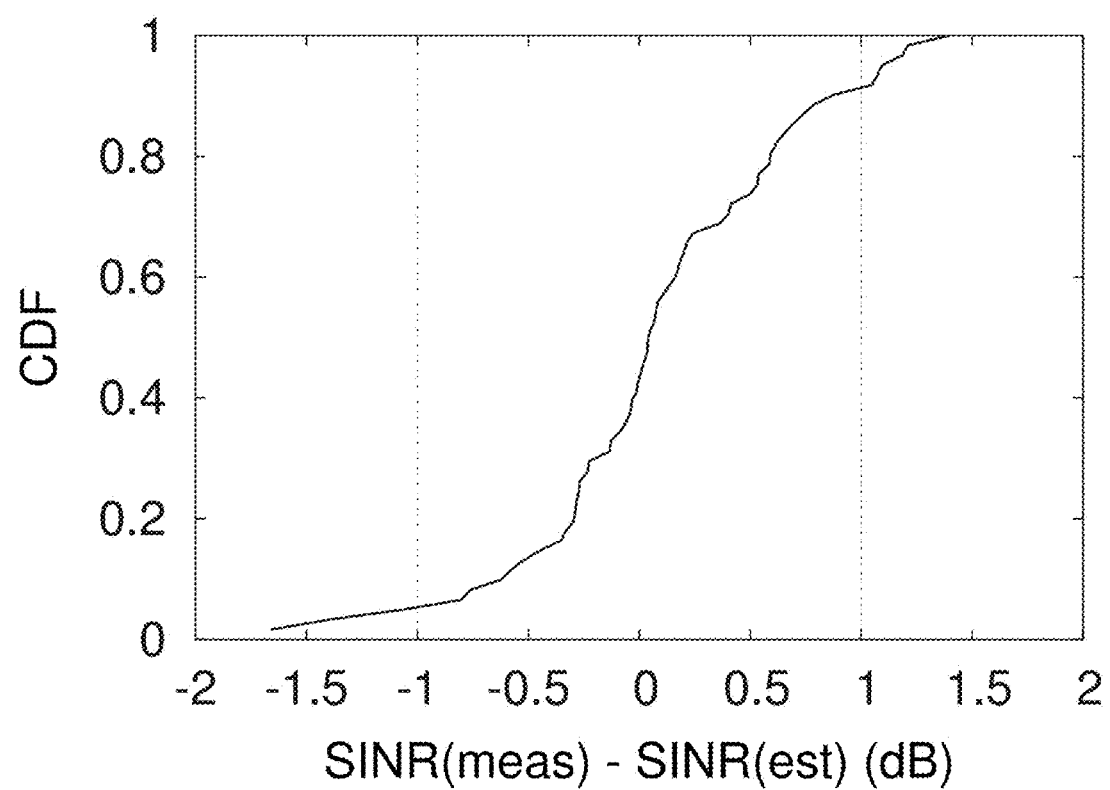

Note that since interference is aggregated in absolute units, the offset for the aggregate interference remains to be β in dB. This is observed in FIG. 6(c), where the offset in the presence of one (A or B) and two (A+B) small cell interferers remains to be the same 4 dB. Thus, with the help of isolated measurements from the small cells, it is indeed possible to estimate SINR, thereby resulting in a linear (in n) complexity of only O(mn).

SINR Estimation Procedure:

ProBeam initiates a measurement phase at the beginning of each epoch, where it operates each small cell BS in the cluster one after another in isolation. When activated, BS i applies its m beam patterns sequentially, each lasting ten frames. All the clients measure the average received SNR from BS i corresponding to beam pattern m. A client j forwards $SNR_{ijm}$, i.e., measured SNR from BS i with beam pattern m to the CC in ProBeam through its current associated BS. In WiMAX and LTE, clients automatically send Channel State Information (CSI) to BS periodically via dedicated uplink channel resources in every frame. We use such standard feature for obtaining our desired SNR measurements. Once ProBeam gathers SNR measurements from all the clients, then any desired SINR (in dB) for a given beam configuration ($\pi=\{\pi(i)\}$, $\forall i$, beam choices for small cells) can be estimated as, $$SINR_{ij\pi}(dB) = SNR_{ij\pi(i)}(dB) - 10\log_{10}\left(\sum_{k \neq i} SNR_{kj\pi(k)}\right) + \beta(dB) \quad (1)$$

Note that SNR measurements can be done within mn×10 frames. For reasonable values of m (say 10 beams) and n (say 10 cells in a cluster), this would amount to 1 sec in LTE (for 1 ms frames). Also actual data is transmitted during the measurement phase, therefore we do not waste resources for SNR measurements. However, reuse cannot be leveraged, whose overhead (reuse loss) can be amortized as long as the epoch duration is several seconds.

Validation: To validate our estimation procedure, we conduct the following experiments with three small cell BSs and a single client. First, the client measures the SNRs from all three BSs for a given beam configuration in isolation and records them. Then, we make the client associate with one of the BSs and measure the SINR in the presence of the other two BSs projecting interference. The beam configuration is chosen so as to project interference to the client under consideration. We repeat the above experiment by changing the beam configuration as well as the topology (i.e., client locations) to obtain confidence in results. Measurements are taken at different client locations to generate plurality of interference scenarios and to also emulate different clients. We obtain over 100 sets of measurements and present the CDF of the SINR estimation error ($SINR_{meas} - SINR_{est}$) in FIG. 6(c). As we can see, 95% of our SINR estimates have less than 1 dB error ($\leq 5\%$), with the highest estimation error being only about 1.65 dB.

Figure 7:
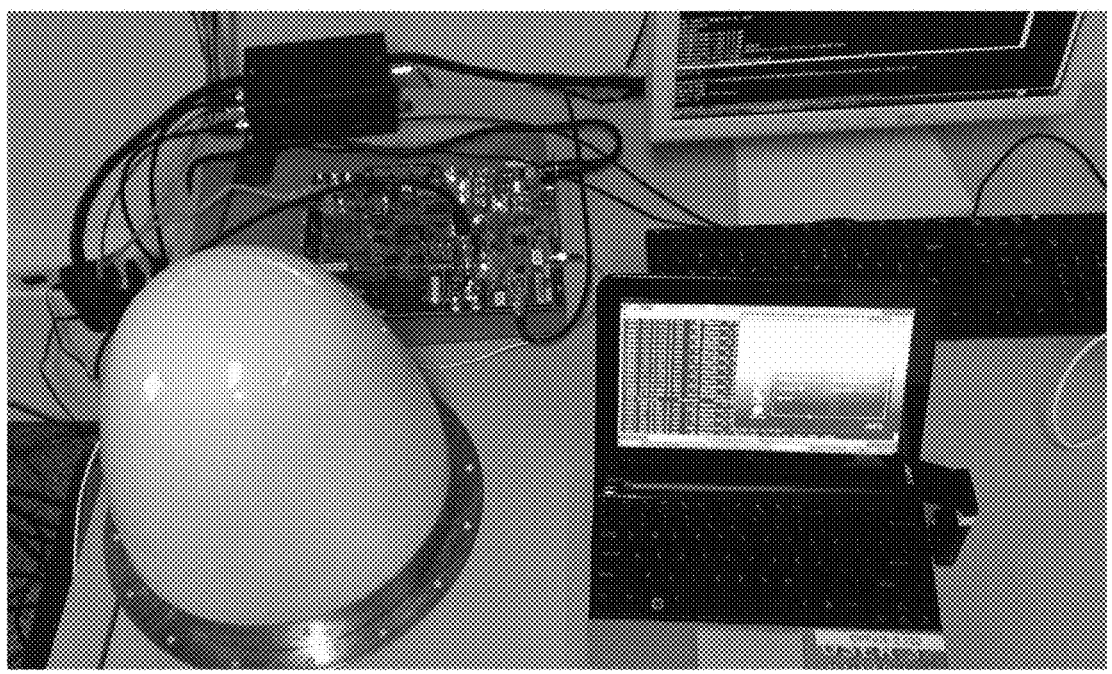
FIG. 7 is a schematic diagram of a illustrative small cell, beamformer and client deployment cording to an aspect of the present disclosure.
Figure 7:
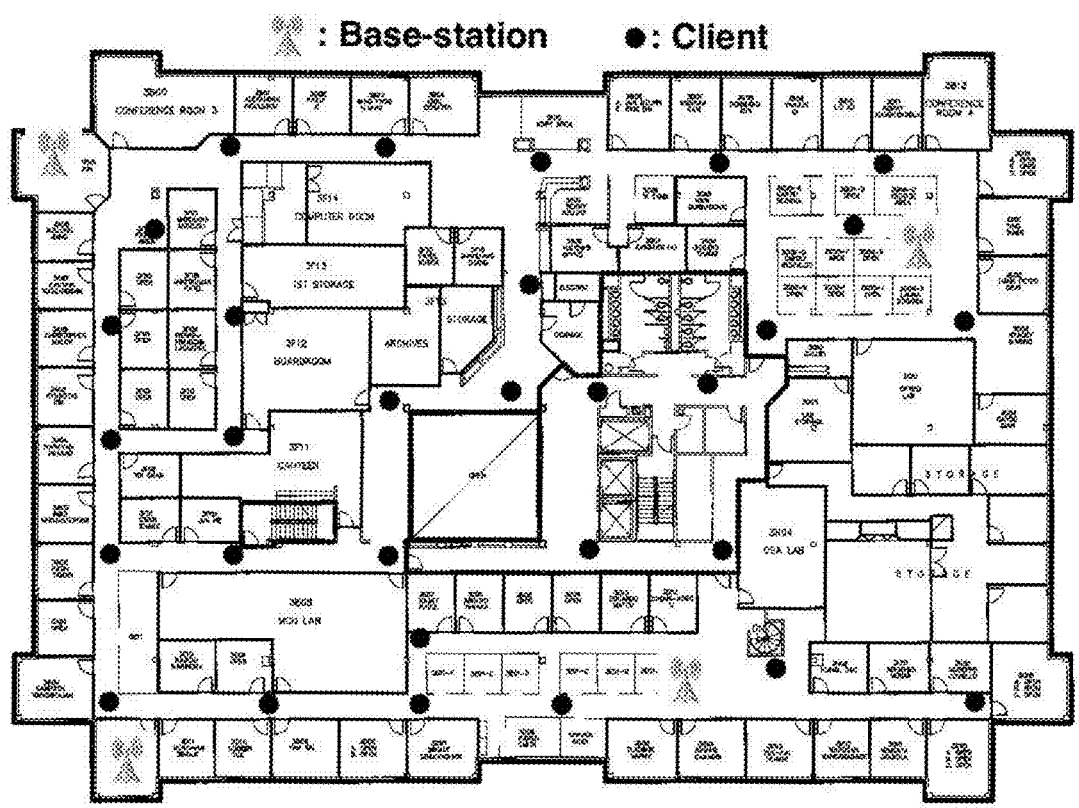

FIG. 7 further presents a microscopic example of SINR measurement and estimation with respect to beam patterns. Similarly, we create a three BS scenario, where two BSs project interference with a fixed beam choice, and measure the $SINR_{meas}$ at the client while applying 16 overlapping beam patterns (45° each) sequentially from the desired BS. For the same scenario, we collect the SNR measurements from all BSs in isolation for the same beam choices and estimate the $SINR_{est}$. As we see from FIG. 6(c), $SINR_{est}$ values are very close to $SINR_{meas}$ across all beam patterns, with the highest estimation error being 1.4 dB in the case of 15th and 16th beam patterns.

Our results clearly indicate the high accuracy of our SINR estimation method, thereby avoiding the complexity of obtaining measurements for all possible combinations of beam patterns at small cells.

Joint Client Association and Beam Selection (CABS)

Similar to other resource management problems, we can formulate our problem as a utility maximization problem in every epoch.

$$\text{Maximize} \sum_{j \in K} U(t_j)$$

where $t_j$ represents the average throughput received by client j in the epoch, K represents the set of clients and U( ) is a function to capture the corresponding utility. Note that the choice of the utility function determines the fairness policy in the system. We assume utility functions to be concave and non-decreasing. This captures proportional fairness (defined by using the utility function $U(t_j)=\log(t_j)$) that is popular in the standards (WiMAX, LTE). While we need to decouple the time scales of operation for CABS from scheduling, it must be noted that the eventual objective is related to throughput and hence dependent on scheduling. Hence, to allow the decoupling, throughput needs to be modeled as the average throughput received by the client over the epoch for a given scheduling policy. Our problem can be formulated as, $$(\pi^*, x^*) = \underset{\pi, x}{\text{argmax}} \sum_{j \in K} \sum_{i \in S} x_{ji} U(t_{ji}^\pi) \quad (2)$$

$$\text{s.t.} \sum_{i \in S} x_{ji} \leq 1, \forall j \in K$$

where K and S represent the set of clients and small cell BSs respectively. Further, $\pi=\{\pi(i), \forall i\}$ denotes the beam selection vector for all BSs, while $x=\{x_{ji}, \forall j,i\}$ denotes the association vector for all clients ($x_{ji}=1$ if client j is associated with BS i and 0 otherwise). $t_{ji}^\pi$ indicates the client j's average throughput when associated with BS i under beam configuration $\pi$ and depends on the SINR ($SINR_{ij\pi}$) seen by the client from BS i in the presence of interference from other BSs under the beam configuration $\pi$.

We note that while fairness (starvation) among clients is typically achieved (avoided) over a longer time period, instantaneous per-frame decisions may favor clients with good channel conditions (e.g., proportional fairness). In the case of CABS, decisions are made at the granularity of epochs. Hence, if fairness is ensured over much longer time scales (>>epoch), then several clients could be subject to starvation in an epoch (several seconds). This would increase the jitter perceived by such clients—a factor critical for real-time media and is hence not desired. Thus, it is more appropriate to ensure fairness within each epoch. This would allow all clients to be scheduled in every epoch. On the other hand, since beam selection decisions are fixed for the entire epoch, accommodating all clients could potentially limit the amount of reuse that can be leveraged in the epoch. Hence, to strike a balance between throughput performance (reuse) and fairness, an alternative is to restrict the utility functions to be non-negative in addition to concave and non-decreasing. This would account for fairness, while at the same time allowing for a small number of clients to be removed from scheduling in an epoch. By weighting the client utility functions inversely proportional to their throughput received ($T_j$) thus far, one can avoid starvation for all clients across epochs.

In the case of proportional fairness, we can modify the utility function as $$U(r_{ji}^{\pi}) = w_j \log(r_{ji}^{\pi}); \text{ if } t_j \geq 1$$

and 0 otherwise, where $$w_j \propto \frac{1}{T_j}.$$

In WiMAX and LTE system, resource allocation to each user is done in terms of resource blocks/slots (each resource block is several symbols and each symbol carries at least one bit in lowest MCS). Since t is the throughput (bits allocated) in an epoch and the minimum allocation is a slot/resource block, t>1 bits whenever a user is allocated. Thus, t=1 will not happen if a user is allocated. Hence, we can assume 0 utility for both t=1 and t=0 and can define the utility function for t≥1 and 0 otherwise. In FIG. 7, we present the utility function while varying the number of slots assigned to a user with respect to various MCS values. The x-axis values are multiple of B bits, where B is the least number of bits that can be sent over a single time-frequency slot using the lowest MCS (BPSK). Given that WiMAX slot consists of two OFDM symbols, $^1$B is two bits with the lowest MCS, and hence B is always >1. This indicates that t>1 whenever resource is allocated to a user and t=0 if there is no allocation.

Further, $T_j$ at current epoch e is updated through an exponentially weighted moving average as $$T_j(e) = \left(1 - \frac{1}{\alpha}\right)T_j(e-1) + \left(\frac{1}{\alpha}\right)t_j(e),$$

where $\alpha$ is the filtering coefficient. Let $r_{ji}^{\pi}$ be the average transmission rates (MCS) seen by client j in a slot when associated with BS i under beam configuration $\pi$, and N be the total number of time-frequency slots in an OFDMA frame with M frames per epoch. In papers by F. Kelly, entitled "Charging and Rate Control for Elastic Traffic", that appeared in *European Transactions on Telecommunications*, vol. 8, pp. 33D37, 1997; and F. P. Kelly, A. Maulloo, and D. Tan, entitled "Rate Control for Communication Networks: Shadow Prices, Proportional Fairness and Stability", that appeared in *Journal of the Operational Research Society*, vol. 49, no. 3, pp. 237-252, 1998, it has been shown that proportional fairness allocation of network resources is equivalent to the optimization of the utility function, max $$\sum_r w_r \log(x_r),$$

where the number of slots are allocated among all the scheduled clients in the proportion of their weights (equal when $w_j=1$, $\forall j$). This would in turn result in an average client throughput of $$t_{ji}^{\pi} = \frac{NMw_j r_{ji}^{\pi}}{\sum_{k \in K} x_{ki} w_k}.$$

Hardness

For a given client association, the problem of beam selection is itself NP-hard [4, 5]. Hence, it comes as no surprise that our joint CABS problem is NP-hard as well. From the perspective of designing algorithms, it helps to understand if beam selection is the only source of hardness or does client association also contribute to the hardness. In this regard, we have the following result.

Theorem 1

For a given beam selection, the CABS problem remains to be NP-hard.

Consider the client association problem for a given beam choice for each of the small cells ($\pi$) under proportional fairness. The resulting objective function is then, $$x^* = \underset{x}{\operatorname{argmax}} \sum_{j \in K} \sum_{i \in S} x_{ji} w_j \log\left(\frac{NMw_j r_{ji}^{\pi}}{\sum_{k \in K} x_{ki} w_k}\right)$$

$$\text{s.t.} \sum_{i \in S} x_{ji} \leq 1, \forall j \in K$$

To prove our problem is NP-Hard, we consider a simple instance of it, consisting of just two small cells: Given a set of K users, find a solution to split the flows among the two small cells, say a and b so as to maximize the overall utility. Let the rate of a user be the same in both cells, $$r_{j,a} = r_{j,b} = \frac{1}{w_j}.$$

Let $K_a$ and $K_b$ represent the set of users that are assigned to cells a and b respectively.

The throughput for a particular user on cell a is given by:

$$t_{j,a} = \frac{1}{\sum_{j \in K_a} w_j} \forall j \in K_a$$

Hence, the utility $U_a$ for all users assigned to cell a is given as:

$$U_a = \sum_{j \in K_a} w_j \times \log(t_{j,a}) \tag{3}$$

$$U_a = \sum_{j \in K_a} w_j \times \log\left(\frac{1}{\sum_{j \in K_a} w_j}\right)$$

Similarly, the utility $U_b$ for all users assigned to cell b is given as:

$$U_b = \sum_{j \in K_b} w_j \times \log\left(\frac{1}{\sum_{j \in K_b} w_j}\right) \tag{4}$$

Now, let $X=\Sigma_{j\in K_a}w_j$. Applying normalized weights, without loss of generality: $1-X=\Sigma_{j\in k_b}w_j$ Hence, the overall utility of the system U is given by $$U = U_a + U_b \qquad (5)$$

$$U = X\log\left(\frac{1}{X}\right) + (1-X)\log\left(\frac{1}{1-X}\right)$$

The solution that maximizes the above utility function is $X=\frac{1}{2}$. Hence, the problem can now be equivalently defined as: Given a set of users K, the solution should return a set of users $K_a$ and a set of users $K_b$ such that the sum of the weights of the flows belonging to the two sets are equal. This is an instance of the subset sum problem (partition problem): Given a set of k integers, the solution should return two subsets such that the sum of the integers of the first set is equal to that of the second set. Our problem can be mapped to a subset sum problem where the input is the set K with elements that have a weight $w_j$, and the output will be two sets such that the sum of the weights of the elements of each set are equal. Since, subset sum problem is proven to be NP Complete, the proof is sufficient to show that our problem is NP Hard.

Consider a client association problem for a given beam choice for each of the small cells ($\pi$) under proportional fairness with equal weights. The resulting objective function is then, $$x^* = \underset{x}{\arg\max} \sum_{j\in K}\sum_{i\in S} x_{ji}\log\left(\frac{NMr_{ji}^\pi}{\sum_{k\in K}x_{ki}}\right)$$

$$\text{s.t.} \sum_{i\in S} x_{ji} \leq 1, \forall j \in K$$

Thus, a client's rate in a small cell is independent of which other specific clients are associated with the same cell but depends only on the number of associated clients. Now, if we simplify our problem to one where the optimal number of users associated with each small cell is already known, then the problem is to only assign clients to cells such that our objective is maximized while the number of clients for each cell is satisfied. This is analogous to the single carrier scheduling problem with finite buffers (SCFB) considered by M. Andrews, and L. Zhang, in a paper entitled "Scheduling Algorithms for Multi-Carrier Wireless Data Systems", that appeared in *IEEE/ACM Transactions on Networking*, vol. 19, no. 2, pp. 447-455, April 2011, where sub-channels (with varying rates for a client) have to be allocated to clients with a limit on buffer data for each client. To see this, consider the mapping of variables from SCFB to our problem as follows: sub-channels correspond to clients, clients to small cells, client buffer limit to number of clients in a small cell, and client rate on a sub-channel to a client's average rate in a small cell. Hence, the hardness of our problem follows from the hardness of SCFB in.

CABS Algorithm

[1] INPUT: average $\rho_{ji}^b$, $\forall i \in S$, $j \in K$, $b \in B$ OUTPUT: Beam selection $\pi(i)$ and client association $A_i$, $\forall i \in S$ Initialization of beam choices, i.e., $\pi(i)$, $\forall i \in [1:|S|]$, $b\in[|B|]$ $L=\emptyset$, $u_{ib}=0$ $1\{j^*\}^+=\arg\max_{j\in K\backslash L}\Sigma_{k\in L\cup j}U(t_{ki}^b)-u_{ib}[$ ]% $j^*$ is arg max of positive incremental utility, it will return only if the incremental utility $\geq 0$, otherwise $\emptyset$ if $j^*=\emptyset$ then break $L\leftarrow L\cup j^*$; $u_{ib}=\Sigma_{k\in L}U(t_{ki}^b)$ $\pi(i)=\arg\max_b u_{ib}$, $\forall i$ $i\in[1:|S|]$ $b\in[1:|B|]$ % Solve client association by varying only one beam element at a time $\pi(i)=b$, $A_i=\emptyset$, $\forall i$ 1 $\{(i^*,j^*)\}^+=\arg\max_{(i,j)s.t.j\notin\cup_{i'}A_{i'}}\{\Sigma_{k\in A_i\cup j}U(t_{ki}^\pi)-\Sigma_{k\in A_i}U(t_{ki}^\pi)\}[$ ] % it will return only if the incremental utility $\geq 0$, otherwise return $\emptyset$ if $(i^*,j^*)=\emptyset$ then break $A_{i^*}\leftarrow A_{i^*}\cup j^*$; $u_{ib}^\pi=\Sigma_i\Sigma_{j\in A_i}U(t_{ji}^\pi)$ $\pi(i)=\arg\max_b u_{ib}^\pi$ Algorithm Since both components of our CABS problem are hard, we must carefully choose the interaction between these components in our solution. Unlike the beam selection problem, the client association problem, although hard, can be solved more efficiently. Hence, ProBeam proposes and employs a simple but efficient client association algorithm as the core building block for solving the CABS problem. At a high level, it solves the client association problem for a given beam configuration and the resulting utility is used to manipulate the beam configuration of small cells in an iterative manner till an efficient CABS solution is attained. The algorithm is given in Algorithm CABS and shown in FIG. 13.

The input to the algorithm is the average client SNR ($\rho_{ji}^b$) for the epoch with respect to its neighboring small cells when they employ different beams ($b\in B$) in isolation (step 1). Using the approach in Section 4.2, the CC can then determine the average client rates in the presence ($r_{ji}^\pi$) and absence ($r_{ji}^b$) of interference. The CC first determines a bootstrap beam configuration for the small cells as follows (steps 3-12). For each of the small cells, it determines the beam that yields the highest utility in the absence of interference, assuming all active clients can be potentially associated with it, i.e., $\pi(i)=\arg\max_{b\in B}\{\Sigma_{j\in K}x_{ji}U(t_{ji}^b)\}$. Note that $t_{ji}^b$ depends on the scheduling policy and is hence coupled with the set of clients associated with the small cell. For example, in proportional fairness, $$t_{ji}^b = \frac{NMw_j r_{ji}^b}{\sum_{k\in K}x_{ki}w_k}.$$

Hence, even to determine a beam initialization $\pi(i)$, one needs to determine the set of clients ($x_{ji}$) that maximize the utility for the given beam in the absence of interference.[2] This can be done optimally by adding users one by one such that incremental utility is maximized (steps 6-10).[3] Specifically, for proportional fairness, the incremental utility (step 7) would correspond to, $$j^* = \underset{j\in K\backslash L}{\arg\max} \sum_{k\in L\cup j}w_k\log\left(\frac{NMr_{ki}^b}{1+|L|}\right) - \sum_{k\in L}w_k\log\left(\frac{NMr_{ki}^b}{|L|}\right)$$

Note that j* is arg max of positive incremental utility ({j*}+, it will return only if the incremental utility $\geq 1$, otherwise return $\emptyset$). CABS does not consider scheduling a client if the incremental utility is not positive by adding such client, therefore j* can be null. Since CABS algorithm takes positive incremental utility $\geq 0$, it is possible that the algorithm finds no user that satisfies such condition after an iteration. In this case, the algorithm stops and breaks out from the iteration (step 8). This is why CABS might leave out some users and schedule them in the next epoch.

After the beam initialization, CABS algorithm perturbs the beam choice for each of the small cells, one by one and one beam at a time. For each of the beam choices at a given cell ($\pi(i)=b$), CABS retains the rest of the beam choices for the other cells unchanged and solves the client association problem for all the small cells jointly under the updated beam configuration to determine the new utility (steps 16-22). In each iteration (steps 19-21), CABS computes a client association while getting a utility value that is then used to determine which beam to pick for that cell under consideration. The actual client association, $A_{i^*}$, is the one that is done in the last iteration (step 21) when the beam for the last cell is fixed and there are no more changes to beams. CABS then fixes the beam choice for the small cell as the one that yields the highest utility among all its choices (step 24). The same process is repeated for updating the beam choice for each of the small cells sequentially (steps 14-25).

Note that, although after one complete round of beam updates for each of the small cells (along with joint client re-association), we cannot guarantee convergence to the optimal solution, our evaluations in Section 5 reveal this is sufficient to obtain a performance very close to that of exhaustive search for beam configurations. CABS runs in $O(|K|^2|S|^2|B|)$, with a large portion of the complexity coming from the client association module $O(|K|^2|S|)$ Performance Guarantee Given the hardness of the joint CABS problem, it is hard to establish an approximation guarantee for the entire algorithm. However, we can establish the following performance guarantee for the core building block in CABS, namely the client association part when the popular proportional fair scheduling policy is considered at the small cells.

Theorem 2

CABS is a ½—approximation algorithm under proportional fairness when beam configuration is given.

We provide some definitions on matroid and sub-modularity that are relevant to the proof.

Partition Matroid:

Consider a ground set $\Psi$ and let S be a set of subsets of $\Psi$. S is a matroid if, (i) $\varnothing \in S$, (ii) If $P \in S$ and $Q \subseteq P$, then $Q \in S$, and (iii) If P, $Q \in S$ and $|P|>|Q|$ there exists an element $x \in P\backslash Q$, such that $Q \cup \{x\} \in S$. A partition matroid is a special case of a matroid, wherein there exists a partition of $\Psi$ into components, $\phi_1, \phi_2, \ldots$ such that $P \in S$ is and only if $|P \cap \phi_i| \leq 1, \forall i$.

Sub-Modular Function:

A function $f(\cdot)$ on S is said to be sub-modular and non-decreasing if $\forall x, P, Q$ such that $P \cup \{x\} \in S$ and $Q \subseteq P$ then, $f(P \cup \{x\}) - f(P) \leq f(Q \cup \{x\}) - f(Q)$ $f(P \cup \{x\}) - f(P) \geq 0$, and $f(\varnothing)=0$ The sub-optimality of maximizing a sub-modular function over a partition matroid using a greedy algorithm of the form $x=\arg\max_{x \in \phi_j} f(P \cup \{x\}) - f(P)$ in every iteration was shown to be bounded by ½ in [21]. We will now show that CABS is such an algorithm (step 19 being the key step), with our client association objective for a given beam configuration ($\pi$) corresponding to a sub-modular function to obtain the desired result.

Consider the ground set to be composed of the following tuples.

$\Psi = \{(i,j): i \in [1:|S|] \forall \varnothing, j \in [1:|K|]\}$

Now $\Psi$ can be partitioned into $\phi_j = \{(i,j): i \in [1:|S|] \forall \varnothing\}, \forall j$, $i = \varnothing$ allows for the possibility of clients not being scheduled in an epoch. Let R be defined on $\Psi$ as a set of subsets of $\Psi$ such that for all subsets $P \in R$, we have (i) if $Q \subseteq P$, then $Q \in R$; (ii) if element $x \in P\backslash Q$, then $Q \cup \{x\} \in R$; and (iii)

$|P \cap \phi_j| \leq 1, \forall j$. This means that R is a partition matroid. Now, it is easy to see that any $P \in R$ will provide a feasible schedule with at most one feasible association to a small cell for each client ($|P \cap \phi_j| \leq 1, \forall j$), thereby allowing the partition matroid R to capture our client association problem. Since each client can associate to only one small cell, our client association objective can be given as, $$f(P) = \sum_{i \in S} \mu_i(P)$$

where, $\mu_i(P) = \sum_{j:(i,j) \in P} w_j \log\left(\frac{NM w_j r_{ij}^\pi}{\sum_{k:(i,k) \in P} w_k}\right)$ It can be seen that if $Q \subseteq P$, then $\mu_i(Q) \leq \mu_i(P)$ since the algorithm picks only elements that result in positive incremental utility. Hence, it only remains to be shown that for an element (i,l) such that $P \cup \{(i,l)\}$ forms a valid schedule, then $f(P \cup \{(i,l)\}) - f(P) \leq f(Q \cup \{(i,l)\}) - f(Q)$. Now, define incremental utility $\Delta_P(i,l) = f(P \cup \{(i,l)\}) - f(P)$ and similarly define $\Delta_Q(i,l)$. Applying the objective function and simplifying, we can show that, $$\Delta_P(i,l) = w_l \log(NM w_l r_{il}^\pi) - w_l \log\left(w_l + \sum_{k:(i,k) \in P} w_k\right) -$$

$$\sum_{j:(i,j) \in P} w_j \log\left(\frac{w_l + \sum_{k:(i,k) \in P} w_k}{\sum_{k:(i,k) \in P} w_k}\right) \Delta_Q(i,l) = w_l \log(NM w_l r_{il}^\pi) -$$

$$w_l \log\left(w_l + \sum_{k:(i,k) \in Q} w_k\right) - \sum_{j:(i,j) \in Q} w_j \log\left(\frac{w_l + \sum_{k:(i,k) \in Q} w_k}{\sum_{k:(i,k) \in Q} w_k}\right)$$

Thus, the difference between $\Delta_P(i,l)$ and $\Delta_Q(i,l)$ arises in the second (reduction) term, which increases with the number of elements in the allocation thus far. Since $Q \cup P$, the reduction term is more for P than for Q, resulting in $\Delta_P(i,l) \leq \Delta_Q(i,l)$. This establishes that the function $f(P)$ is indeed sub-modular. Further, our client association problem aims to maximize this non-decreasing sub-modular function over a partition matroid. Hence, picking the (client, small cell) pair yielding the highest marginal utility for a given beam configuration in CABS (steps 16-22) would correspond to determining $$(i^*, j^*) = \arg\max_{(i,j) \in R} \{f(P \cup \{(i,j)\}) - f(P)\}$$

Thus, the sub-optimality of ½ would then follow from the result in [22].

Scheduling

Once the CC determines the beam configuration and client association for the epoch, the appropriate beam and allowable client set are notified to each of the small cell BSs for configuration. Each small cell BS then locally runs its scheduling algorithm (e.g., proportional fair) among the associated clients for each frame in the epoch, while employing the chosen beam for its transmissions. Further, instantaneous channel rate feedback from clients is used in per-frame scheduling for leveraging multi-user diversity.

Practical Considerations

Mobile Clients:

While beamforming algorithms work well for static clients, it is important to understand their limitations with respect to mobile clients. Note that, any adaptive beamforming scheme that relies on fine grained channel state information (CSI) will be highly sensitive to lack of timely and accurate CSI, both of which are hard to obtain during mobility. On the other hand, switched beamforming relies only on coarse grained channel feedback (SNR or RSSI) and hence is less sensitive to mobility. As long as the epoch duration is not long enough (several seconds is reasonable), pedestrian to moderate vehicular speeds can be accommodated without warranting a completely new beam to be employed for the client.

Epoch Duration:

Keeping the epoch duration long is conducive for implementation and overhead. However, it must also be capable of tracking traffic dynamics and client mobility. Allowing for a few seconds of epoch duration strikes a good balance between these objectives.

Average SNR:

Note that employing average SNR feedback for CABS does not preclude the small cells from leveraging multi-user diversity during scheduling. Using average SNR allows CABS to account for the scheduling policy in its CABS decisions, while at the same time avoiding the need to jointly address scheduling with CABS—the latter not being conducive to a practical implementation. Once the CABS decisions are made at the CC and disseminated to the small cells, local per-frame scheduling at the small cells does leverage multi-user diversity with the help of instantaneous channel feedback from clients System Evaluation We implement ProBeam on a WiMAX testbed and evaluate its performance through both experiments and large scale simulations. We first describe our testbed, comparing schemes, evaluation metrics and then present system evaluations.

Testbed and Prototype Implementation

Our WiMAX testbed includes four small cells (deployed in an indoor enterprise environment), clients and a central controller as depicted in FIG. 7. The small cell BS is a PicoChip WiMAX platform based on IEEE 802.16e standard. The BS is tuned to operate in a 10 MHz bandwidth with the center carrier frequency of 2.59 GHz, for which we have obtained an experimental license to transmit WiMAX signals over the air. In the absence of a macro cell to coordinate with, we use a GPS module to synchronize the WiMAX frame transmissions across the small cells. Each BS has an eight element (analog) phased array antenna connected to its RF port. The antenna array generates sixteen overlapping beam patterns of 45° each, spaced 22.5° apart to cover the entire azimuth of 360°. The BS controls the antenna array through a serial port application that we have developed in C. There is a delay of one frame (5 msec) before a particular beam pattern is actually applied by the antenna following the command from the application. This is not an issue given the time scale of epoch or the measurement phase.

ProBeam is standards compatible and works with commercial off-the-shelf clients. We use Windows laptops with a WiMAX interface and omni-directional antennas as our clients. Investigating directionality at the clients is part of our future work. We select 30 locations as marked in FIG. 7 for client deployments. The clients are oblivious to beam selection at BS and simply measure the SNR and report them back to the BS for SINR estimations through standard feedback mechanisms. Our experiments have verified that the SNR received on each beam is relatively stable over several seconds for static clients. This gives confidence to the SNR measurements reported by clients in the measurement phase.

All algorithms (CABS and reference schemes) are implemented on the CC and do not require any changes or operational overhead to the BS. All BSs are connected to the CC through an ethernet switch in our set-up.

Prototype Evaluations

Topologies and Rate Adaptation:

Each data point in our result is averaged over multiple topologies, which are generated by picking random subsets of client locations (among 30) for a given number of clients. Further, unless otherwise specified, we consider topologies with four small cells and twenty clients. To remove the influence of rate adaptation algorithms, we consider an ideal PHY rate adaptation by trying out all MCS and record the highest throughput (best MCS) for a client given a network configuration.

Reference Schemes:

We evaluate the performance of our CABS algorithm in ProBeam against the following benchmark algorithms.

Decoupled:

Client association is decoupled and first computed based on SNR, followed by determination of coordinated beams for each BS using the same beam selection component as in CABS.

CABS-All:

Allows for joint determination of client association and beam selection as in CABS but requires that all clients be associated and scheduled in every epoch.

UB-Beam:

Employs the same client association component as in CABS but exhaustively searches over all possible beam combinations at BSs—serves as an upper bound for beam selection in CABS.

UB-Assoc:

Employs the same beam selection component as in CABS but exhaustively searches over all possible combinations of client association—serves as an upper bound for client association in CABS.

Evaluation Metrics:

We consider the following metrics.

Throughput:

Aggregate throughput of all clients in the network.

Utility:

Captures both throughput and fairness; aggregate utility of all clients: $\Sigma_{j \in k} w_j \log(T_{c_j})$ if $T_{c_j}$>, where C is the list of the clients and $T_{c_i}$ is the throughput for client $c_i$.

Fraction of Scheduled Clients:

Captures the number of clients not scheduled in an epoch to improve spatial reuse (in CABS and upper bounds).

Load Balancing Factor:

Measures Jain's fairness index among the number of clients associated with each BS.

Throughput

Figure 8A:
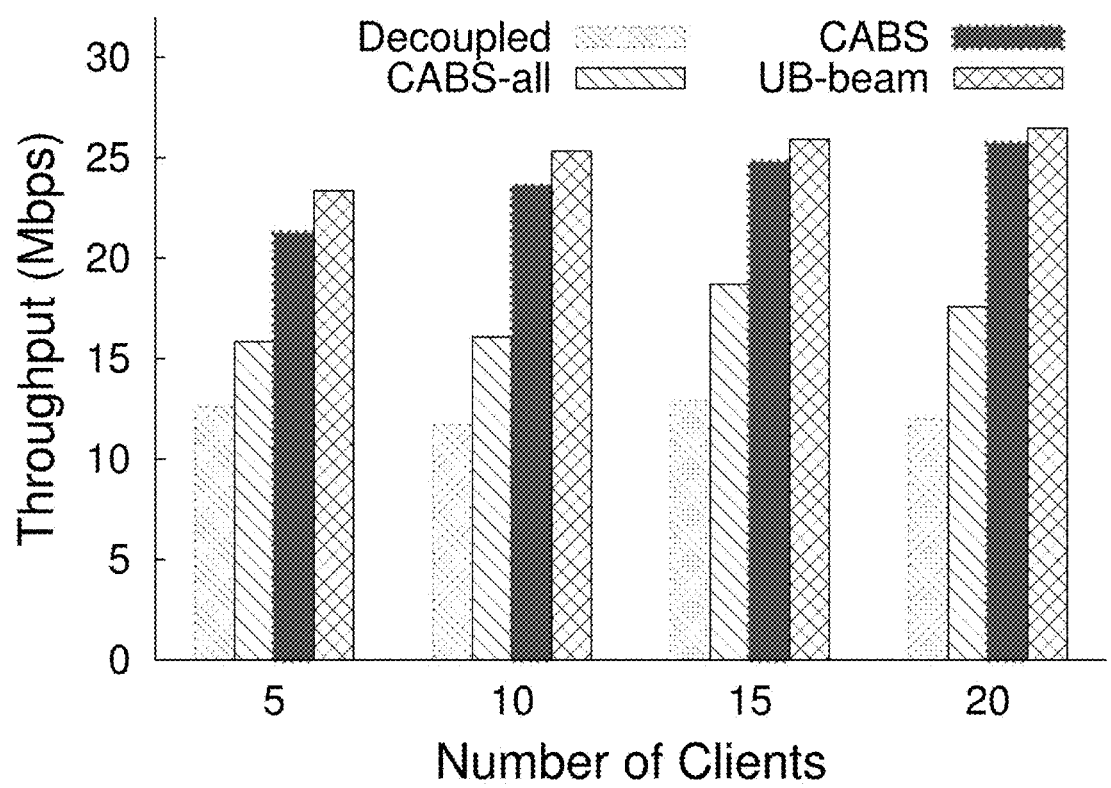
FIGS. 8(a)-8(c) show a series of graphs depicting an experimental evaluation of our ProBeam system and method with 4 small cells showing: (a) throughput as a function of the number of clients; (b) throughput as a function of the number of base stations; and (c) system utility according to an aspect of the present disclosure.

FIG. 8(a) shows the throughput results as a function of number of clients in the network. Three observations can be made: (i) CABS' performance is within 96% of that of exhaustive beam search and is not impacted by client density. Given the complexity of the latter, CABS provides a fine balance between performance and complexity. (ii) The increased spatial reuse from jointly addressing client association with beamforming (CABS-all) provides gains as high as 50% (over the decoupled approach). Further, the gains are more pronounced at higher client density, where it becomes harder to isolate interference between small cells without a joint optimization that allows for flexible client association. (iii) Interestingly, by going one step further and allowing some clients from not being scheduled in a given epoch provides CABS with an additional 50% gain over CABS-all, resulting in a net gain of around 115% over the decoupled approach. Removing even a small fraction of bottleneck clients from scheduling in an epoch can greatly improve the spatial reuse configuration between small cell.

Figure 8B:
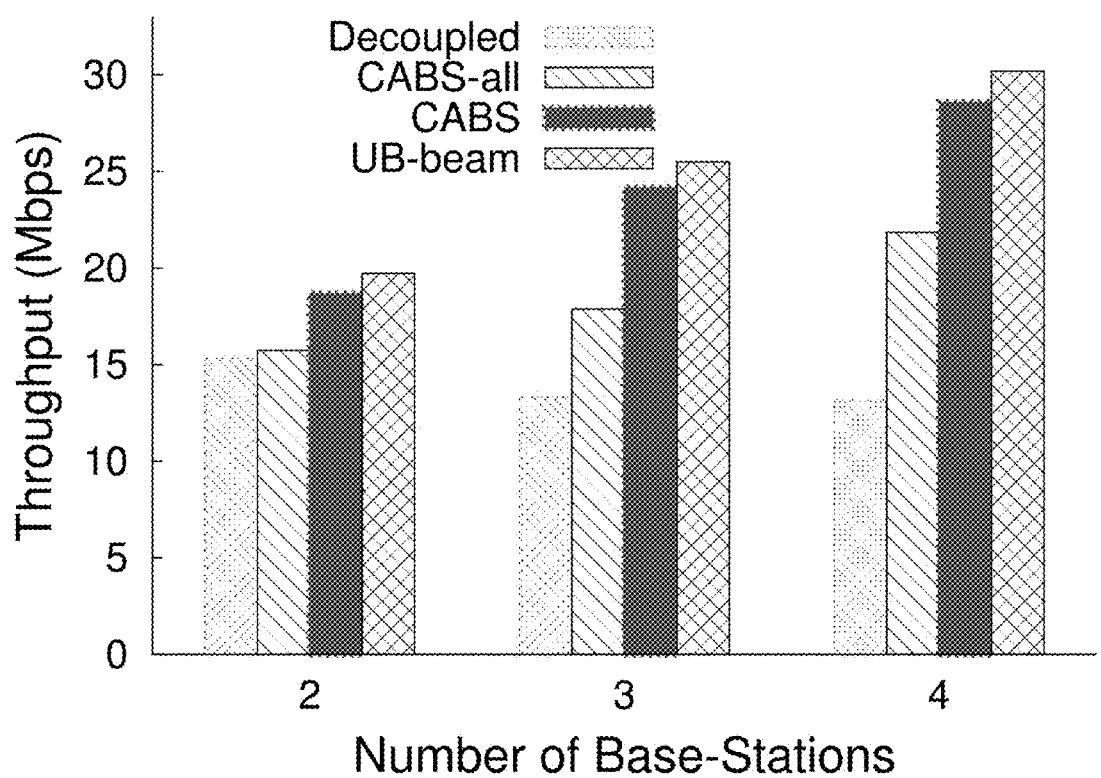

The impact of interference from increased number of BSs is presented in FIG. 8(b). As the number of BS increases, the interference in the network gets severe therefore the throughput improvement from additional BS does not follow linear increment. In spite of the increased interference, the ability to jointly address client association with beam selection helps CABS handle interference effectively, the benefits of which are more pronounced with larger number of interferers.

Figure 8C:
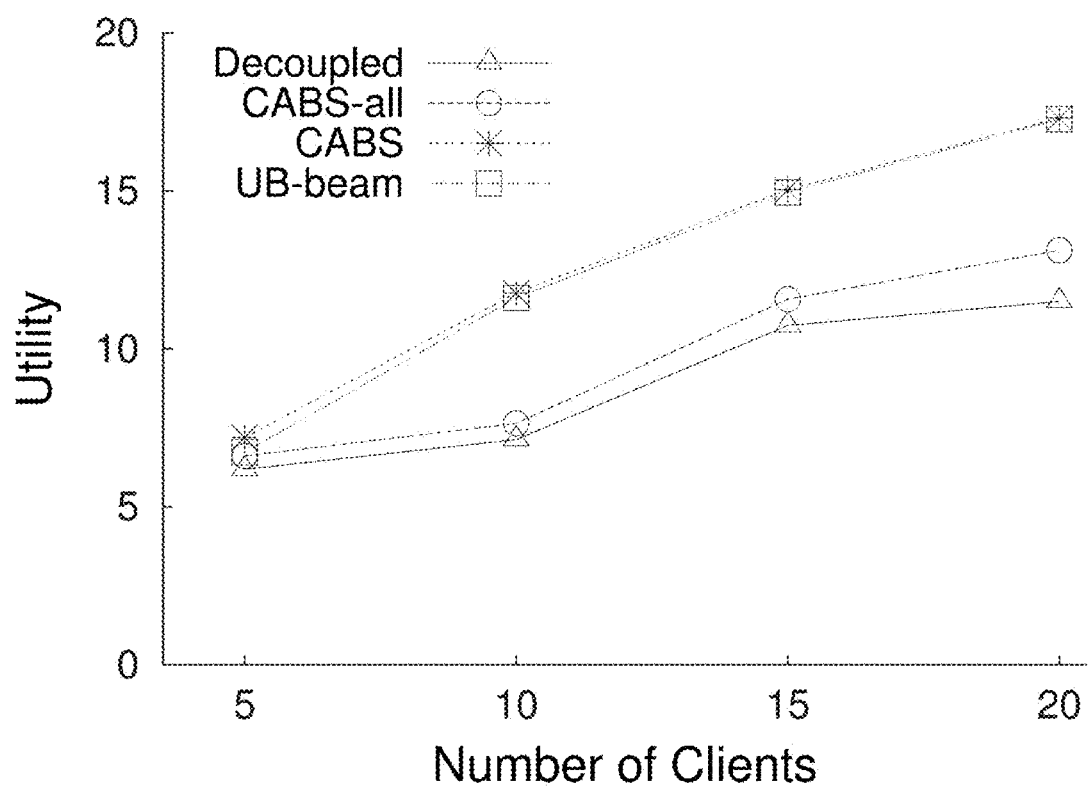

Recall that some of the reuse gains in CABS comes from removing a subset of clients from scheduling in a given epoch. While starvation of such clients is avoided across epochs, it is important to understand if the throughput gains of CABS are not realized at the expense of fairness even within an epoch. The utility measure helps account for fairness within an epoch, whose results are presented in FIG. 8(c). It can be clearly seen that CABS' utility is very close to that of its upper bound and outperforms that of the (baseline) decoupled approach. Thus, adopting a utility based approach to joint CABS, enables ProBeam to bypass some clients from an epoch to maximize reuse gains without compromising on fairness.

Figure 9A:
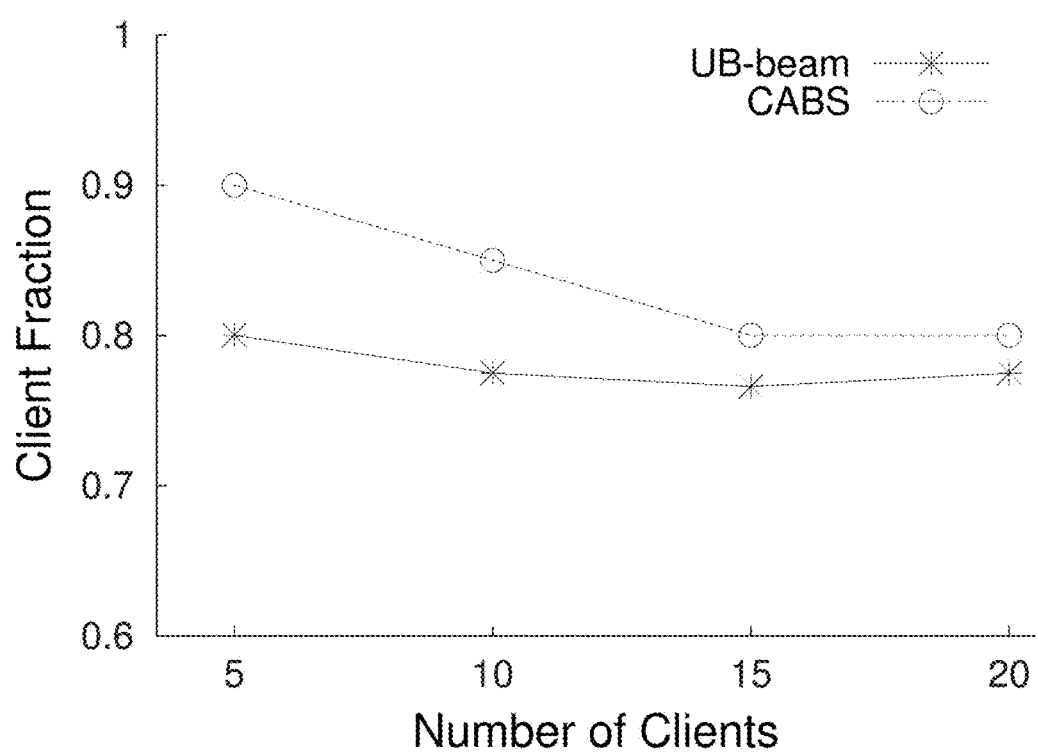
FIGS. 9(a)-9(b) show a series of graphs depicting effective client management showing (a) scheduled client fraction as a function of the number of clients and (b) network load balancing according to an aspect of the present disclosure.

Note that if the number of clients bypassed is large, this would automatically reflect in a reduced system utility. Hence, to further verify this, we present the fraction of scheduled clients in an epoch in FIG. 9(a). This clearly shows that only a small fraction of clients (10-20%) are bypassed in CABS. The upper bound is more aggressive in deferring clients to the next scheduling epoch, which in turn contributes to its marginal throughput gains over CABS (FIG. 8), however, the gains are minimal.

Load Balancing

Figure 9B:
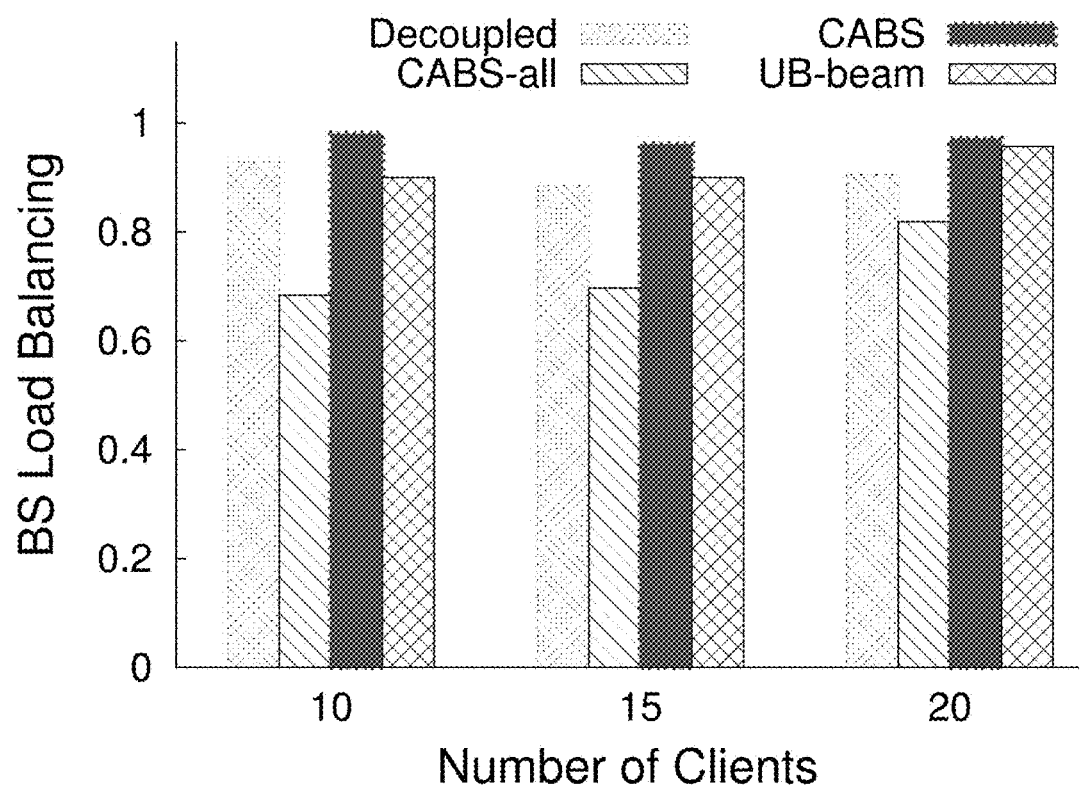

A by-product of utility maximization in CABS is that it should automatically lead to load balancing. This is because, given a fixed amount of frame resources, balancing number of users across cells, provides more resources per user and hence better aggregate utility. The load balancing factor, captured through Jain's fairness index between number of clients associated with small cells, is presented in FIG. 9(b). CABS provides very good load balancing as expected. The decoupled approach does not implicitly account for load balancing, but a uniform distribution of clients automatically provides reasonable load balancing, when SNR-based client association is employed. The interesting observation is that CABS-all's load balancing suffers, especially when the number of clients is not high. Recall that CABS-all's throughput gain (over the decoupled approach) from better interference suppression (and hence reuse) through flexible association, comes at the expense of potential load imbalance across cells, especially when all clients are accommodated.

Trace-Driven Simulations

Our experimental set-up with few tens of clients and three dominant interferers constitutes a realistic set-up for a cluster of small cells. However, to further understand CABS's effectiveness in much denser deployments (10 BSs and 90 clients), we resort to trace based simulations. We collect SNR traces for clients from our experimental network, feed it into a simulator running ProBeam (SINR estimation and CABS) to evaluate the various algorithms. We place our four BSs in various other locations to emulate more small cell BSs and measure SNR traces at the clients from them on all beams. Similarly, we also vary the client locations to emulate a larger set of clients and obtain corresponding SNR traces. Given the traces, we can generate a topology with a specific number of BSs and clients, by sampling BSs and clients randomly from our SNR trace database.

Figure 10A:
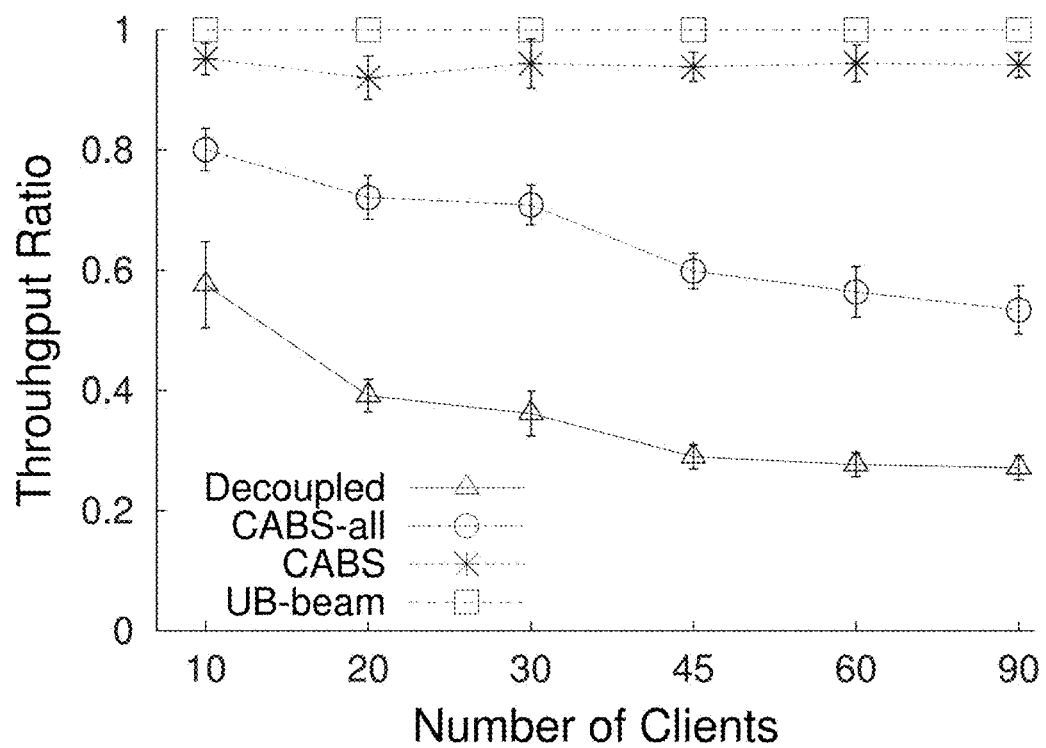
FIGS. 10(a)-10(d) show a series of graphs depicting large scale evaluation of our ProBeam system and method showing (a) throughput ratio as a function of the number of clients; (b) throughput ratio as a function of the number of base stations; (c) system utility as a function of the number of clients; and (d) base station load balancing as a function of the number of clients according to an aspect of the present disclosure.
Figure 10B:
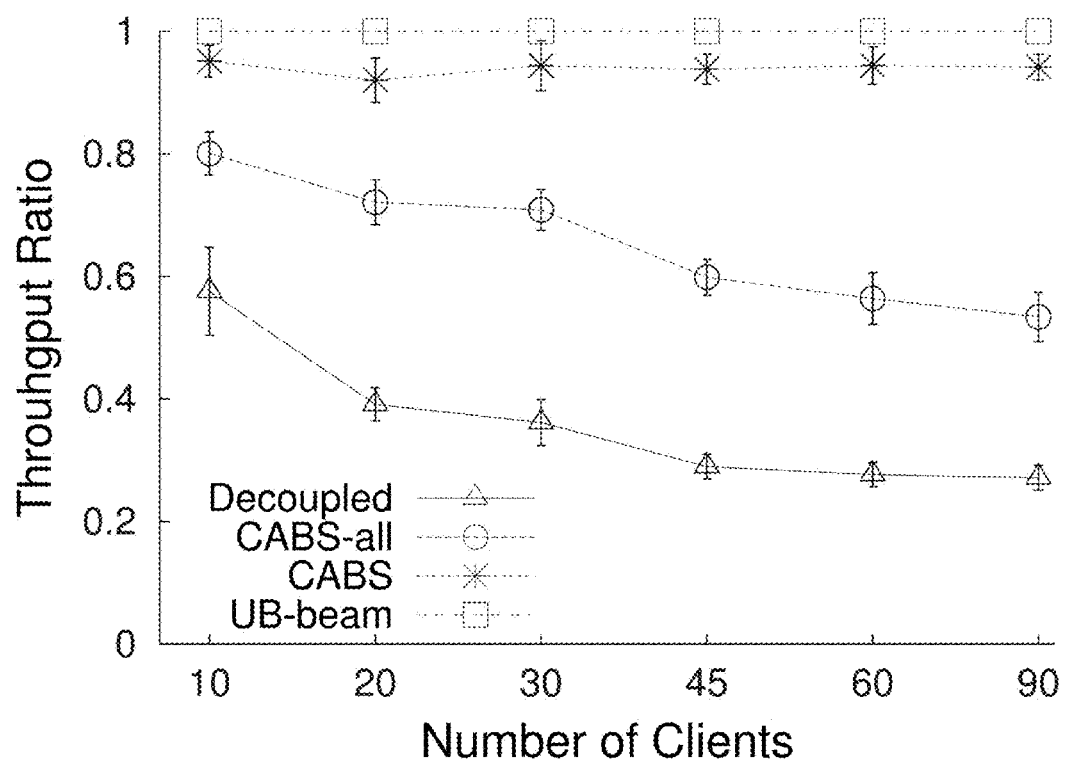
Figure 10C:
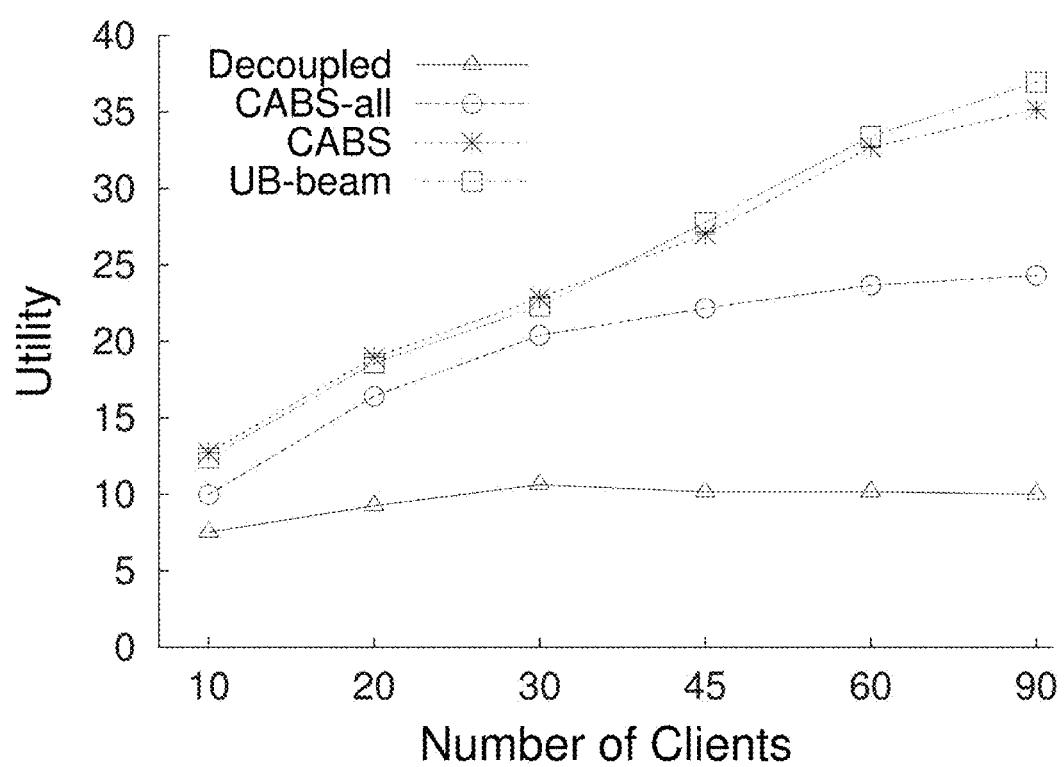
Figure 10D:
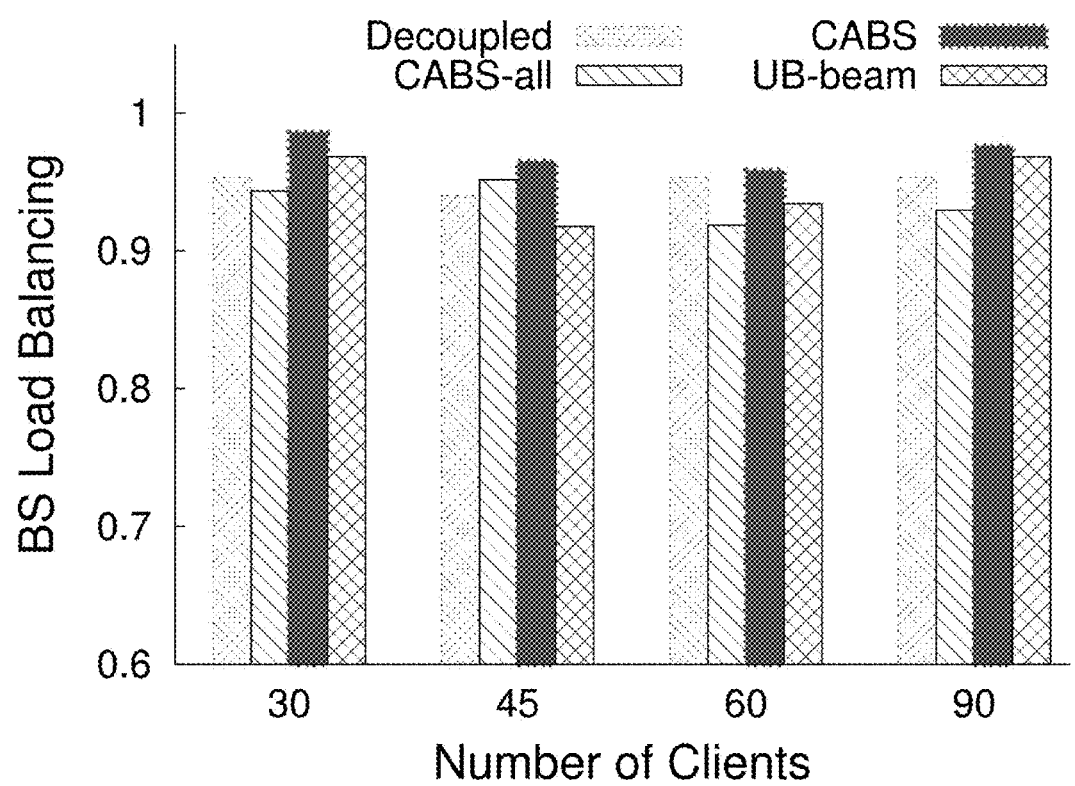

Our simulation results are presented in FIG. 10(a), where throughput is measured as a fraction of that achieved by the upper bound (UB-beam). The trends in these large scale results, including the magnitude of gains possible with CABS, are very similar to those from the experiments, thereby reinforcing our inferences from the prototype evaluation. For example, the CABS yields almost 96% of throughput of what UB-beam provides and the gain is consistent regardless of number of clients or BSs in the network. We also present the fraction of scheduled clients for CABS and UB-beam in FIG. 10(b). As the network density increases more clients are bypassed for next scheduling epoch because it is hard to schedule the clients who experience interference severely. Therefore, the UB-beam approach aggressively leaves out more clients to the next epoch to achieve higher system utility. CABS schedules more clients than the UB-beam meanwhile providing similar utility (FIG. 10(c)). In addition, CABS balances network load most efficiently even in a dense deployment as we see in FIG. 10(d). CABS close performance with respect to its upper bound in these results indicates the efficiency of its beam selection component as both the schemes employ the same client association mechanism.

Figure 11A:
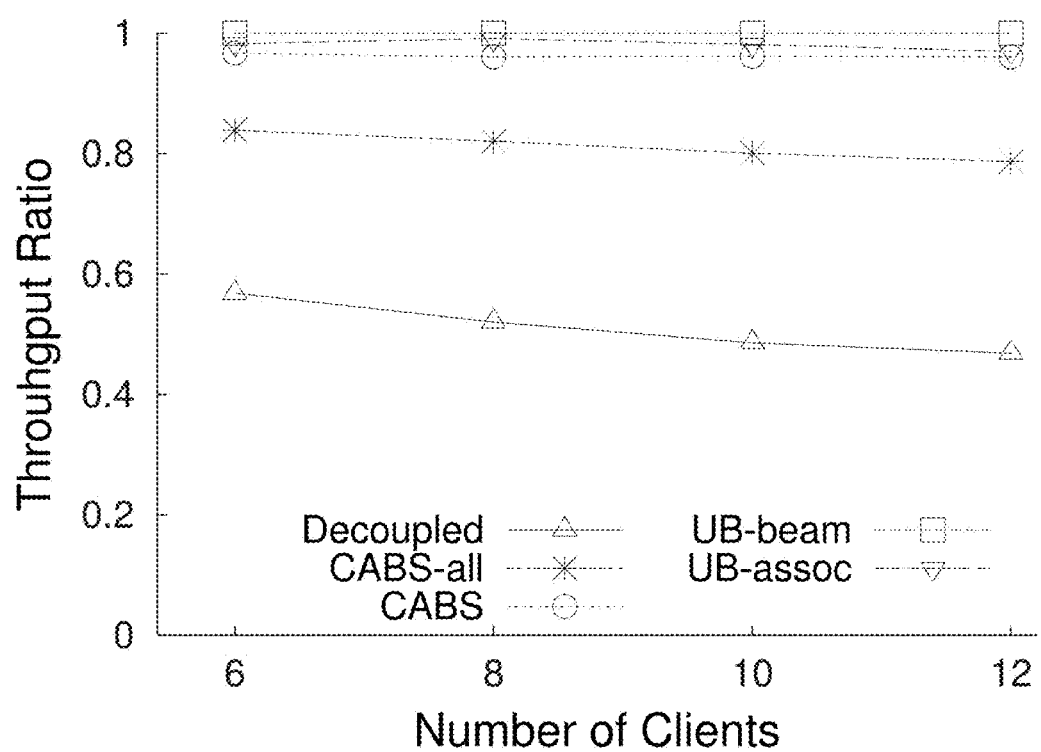
FIGS. 11(a)-11(b) show a series of graphs depicting evaluation of client association component in our ProBeam system and method showing (a) throughput ratio as a function of the number of clients; and (b) utility as a function of the number of clients according to an aspect of the present disclosure.
Figure 11B:
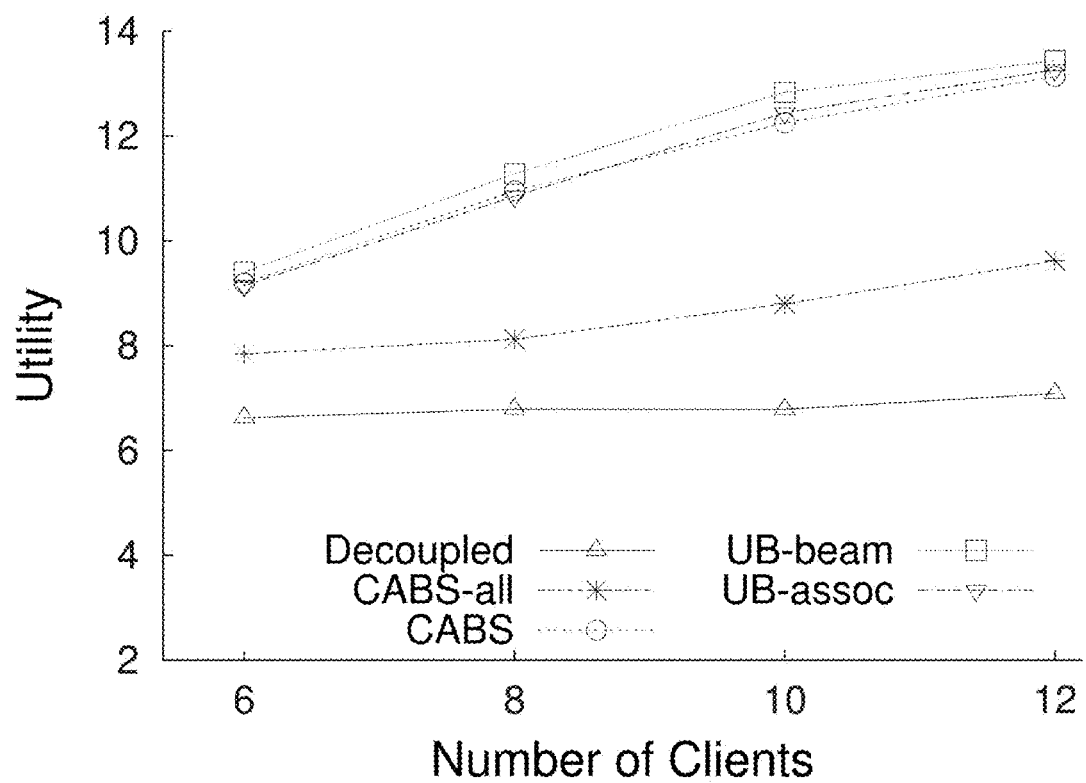

Given the hardness of computing a tight upper bound for the joint CABS solution, we now evaluate the efficiency of its client association component as well. We compare it against an upper bound for client association (UB-assoc) that exhaustively searches over all possible client associations, while employing the same beam selection mechanism as in CABS. The results in FIG. 11(a) and FIG. 11(b) indicate that, while the sub-optimality of CABS' client association component can at most be within half of the optimal in the worst case, in practice, it yields a performance that is very close to its upper bound (i.e., UB-beam and UB-assoc). Thus, the high efficiency of the individual components in CABS in turn synergistically contribute to the net gains seen by it.

Simulation results show that CABS handles the interference effectively, and hence it can provide steady performance regardless of the level of the interference in dense deployments (i.e., number of clients, number of BSs).

CONCLUSIONS

As should be readily apparent to those skilled in the art, we have shown a design and implementation of Pro-Beam—a practical system for improving spatial reuse through beamforming in OFDMA based small cell networks. We have shown that decoupling beamforming from client scheduling is necessary for practical feasibility. Further, we highlight the need to jointly address client association with beamforming to maximize the reuse benefits from the latter. ProBeam incorporates a low complexity, highly accurate SINR estimation module with less than 1 dB error 5%) to determine interference dependencies between small cells. It also houses an efficient, low complexity joint client association and beam selection algorithm for the small cells that yields close-to-optimal performance. Prototype implementation in a real WiMAX networks of four small cells shows 115% of capacity gain compared to other baseline reuse schemes. We also demonstrate the scalability and efficacy of our system in larger scale settings through simulations. Most of our system components are also applicable to LTE and LTE-A with minor modifications.

Figure 12:
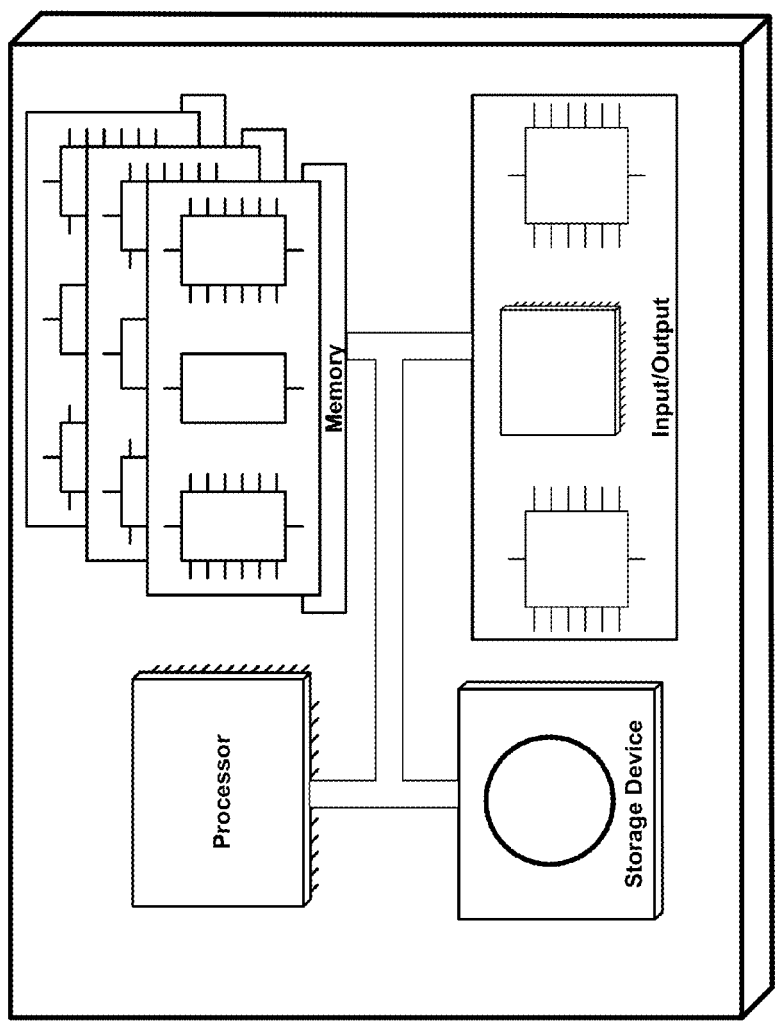
FIG. 12 is a schematic block diagram of an exemplary computing device upon which methods according to an aspect of the present disclosure may be programmed, stored, and executed.

The foregoing is to be understood as being in every respect illustrative and exemplary, but not restrictive, and the scope of the invention disclosed herein is not to be determined from the Detailed Description but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. For example, the exemplary computer system in FIG. 12 is but an example of the system upon/within methods according to the present disclosure may be stored, programmed and/or executed. Those skilled in the art could implement various other feature combinations without departing from the scope and spirit of the invention.

The invention claimed is:

1. A computer implemented method for providing beamforming and spatial reuse in a small-cell wireless network comprising:
   providing a central controller (CC) to perform resource and interface management for small cells jointly with a high speed backhaul which interconnects the small cells with the CC thereby providing for information exchange between the small cells;
   receiving signals from the small-cell wireless network with wireless transceivers;
   estimating a signal-to-interference-plus-noise ratio (SINR) of clients in the small cells to determine any interference dependencies between small cells in the wireless network in the presence of beamforming, wherein said SINR is determined from signal-to-noise (SNR) measurement according to the following relationship $$SINR_{ij} = \frac{SNR_{ij}}{\sum_{k \neq i} INR_{kj} + 1}$$

such that only a linear number of measurements is made, where SNR at client j from a base station i is related to its SNR and net interference-to-noise ratio (INR) from other base stations by $$INR_{kj} = \sum_{k \neq i} INR_{kj} + 1$$

and $INR+1 \approx INR$; and
associating one or more of the clients with the particular beamforming;
selecting particular beam patterns for each small cell such that spatial reuse is increased; and
providing beamforming and spatial reuse for transmission using the transceivers in a small-cell wireless network.

2. The method of claim 1 wherein beamforming is independent of client scheduling.

3. The method of claim 1, comprising providing spatial reuse.

4. The method of claim 1, comprising performing in each epoch of time: (i) interference estimation for beamforming where clients measure an average signal to noise ratio (SNR) on each beam from each base station (BS) and forward it to the CC, which then infers corresponding SNR for beam combinations at the BS.

5. The method of claim 4, comprising joint beam selection and client association based on interference information collected, wherein the CC runs a spatial reuse technique to determine a beam choice for each of the small cells as well as clients associated with the small cell for a particular epoch.

6. The method of claim 4, wherein each small cell BS receives a beam choice and client set, comprising scheduling clients locally using a scheduler for each frame in an epoch while applying the beam selected to frame transmissions.

7. A computer implemented method for providing beamforming and spatial reuse in a small-cell wireless network comprising:
   providing a central controller (CC) to perform resource and interface management for small cells jointly with a high speed backhaul which interconnects the small cells with the CC thereby providing for information exchange between the small cells;
   receiving signals from the small-cell wireless network with wireless transceivers;
   estimating a signal-to-interference-plus-noise ratio (SINR) of clients in the small cells to determine any interference dependencies between small cells in the wireless network in the presence of beamforming, wherein said SINR is estimated from signal-to-noise (SNR) measurement for a given beam configuration $\pi = \{\pi(i)\}, \forall i$, beam choices for small cells according to the following relationship $$SINR_{ij\pi}(dB) = SNR_{ij\pi(i)}(dB) - 10\log_{10}\left(\sum_{k \neq i} SNR_{kj\pi(k)}\right) + \beta(dB)$$

where $SINR_{ij\pi}$ is the SINR for client j from a base station i at beam configuration $\pi$ and $\beta$ is an offset; and
associating one or more of the clients with the particular beamforming;
selecting particular beam patterns for each small cell such that spatial reuse is increased; and
providing beamforming and spatial reuse for transmission using the transceivers in a small-cell wireless network.

* * * * *